United States Patent
Jines et al.

(10) Patent No.: US 8,573,554 B2
(45) Date of Patent: *Nov. 5, 2013

(54) CONDUCTOR SYSTEM

(75) Inventors: Michael D. Jines, Northfield, MN (US); Thomas A. Dettmann, New Prague, MN (US); Jodi Tuthill, Waterville, MN (US); Kevin Krumholz, Owatonna, MN (US)

(73) Assignee: Wenger Corporation, Owatonna, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,842

(22) Filed: Sep. 13, 2012

(65) Prior Publication Data

US 2013/0001177 A1 Jan. 3, 2013

Related U.S. Application Data

(63) Continuation of application No. 12/844,522, filed on Jul. 27, 2010, now Pat. No. 8,292,250.

(60) Provisional application No. 61/228,926, filed on Jul. 27, 2009, provisional application No. 61/285,476, filed on Dec. 10, 2009.

(51) Int. Cl.
*A47B 19/00* (2006.01)

(52) U.S. Cl.
USPC ............ 248/441.1; 248/558; 108/28; 108/64; 108/176; 211/85.6

(58) Field of Classification Search
USPC ........... 248/558, 441.1, 448, 159; 108/28, 32, 108/59, 64, 90, 99, 176, 177, 186; 211/85.6, 133.4, 126.4, 162; 84/421
See application file for complete search history.

(56) References Cited

U.S. PATENT DOCUMENTS

| | | | | |
|---|---|---|---|---|
| 3,893,363 A * | 7/1975 | Cohen | ............................ | 84/402 |
| 4,321,974 A | 3/1982 | Klemm | | |
| 5,037,057 A * | 8/1991 | Andrews | ........................ | 248/460 |
| 5,080,315 A * | 1/1992 | Tucker-Schafer | .......... | 248/441.1 |
| 6,161,487 A * | 12/2000 | Chang | ......................... | 108/50.01 |
| 6,536,720 B1 * | 3/2003 | Yu | ............................... | 248/125.7 |
| 6,662,734 B2 * | 12/2003 | Chang | ........................... | 108/103 |
| 8,292,250 B2 * | 10/2012 | Jines et al. | ................... | 248/441.1 |
| 2002/0066837 A1 * | 6/2002 | Dunbar | ........................ | 248/122.1 |

FOREIGN PATENT DOCUMENTS

| | | |
|---|---|---|
| EP | 1 973 097 A2 | 9/2008 |
| JP | 05-033198 | 4/1993 |
| JP | 07-034488 | 6/1995 |

OTHER PUBLICATIONS

File history for U.S. Appl. No. 12/844,522, filed Jul. 27, 2010. Inventors: Michael D. Jines et al.

\* cited by examiner

*Primary Examiner* — Bradley Duckworth
(74) *Attorney, Agent, or Firm* — Patterson Thuente Pedersen, P.A.

(57) ABSTRACT

A conductor system includes a music stand and at least one support rack. The music stand and the support rack can be used independently, but can provide additional stability when coupled to each other. The podium and the rack can be positioned to accommodate the preferences of a user, including by height, radial, lateral, and pitch/tilt adjustments. The support rack is adapted to receive any number of user instruments, such as, for example, a laptop or an electronic keyboard. The podium and the rack can be transported without being lifted completely off the support surface.

7 Claims, 39 Drawing Sheets

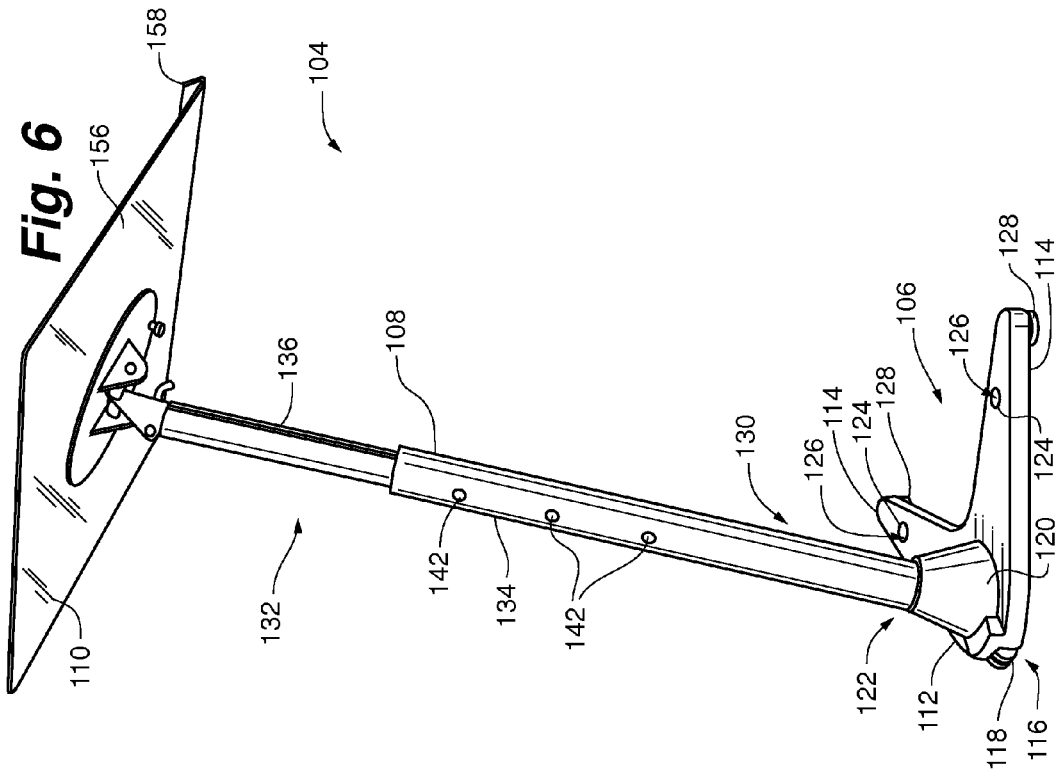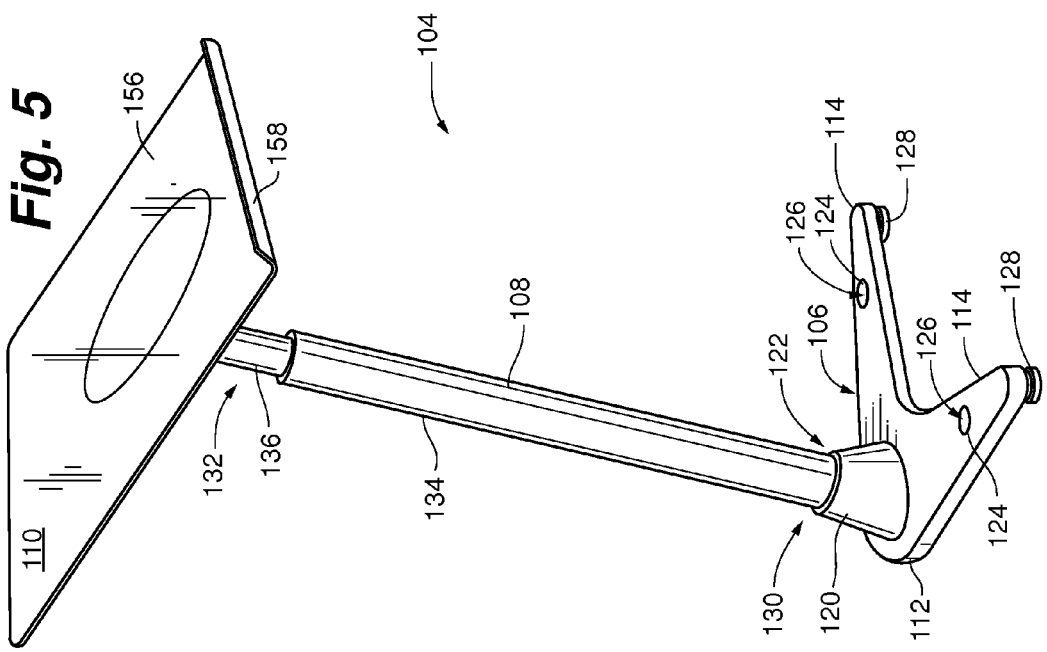

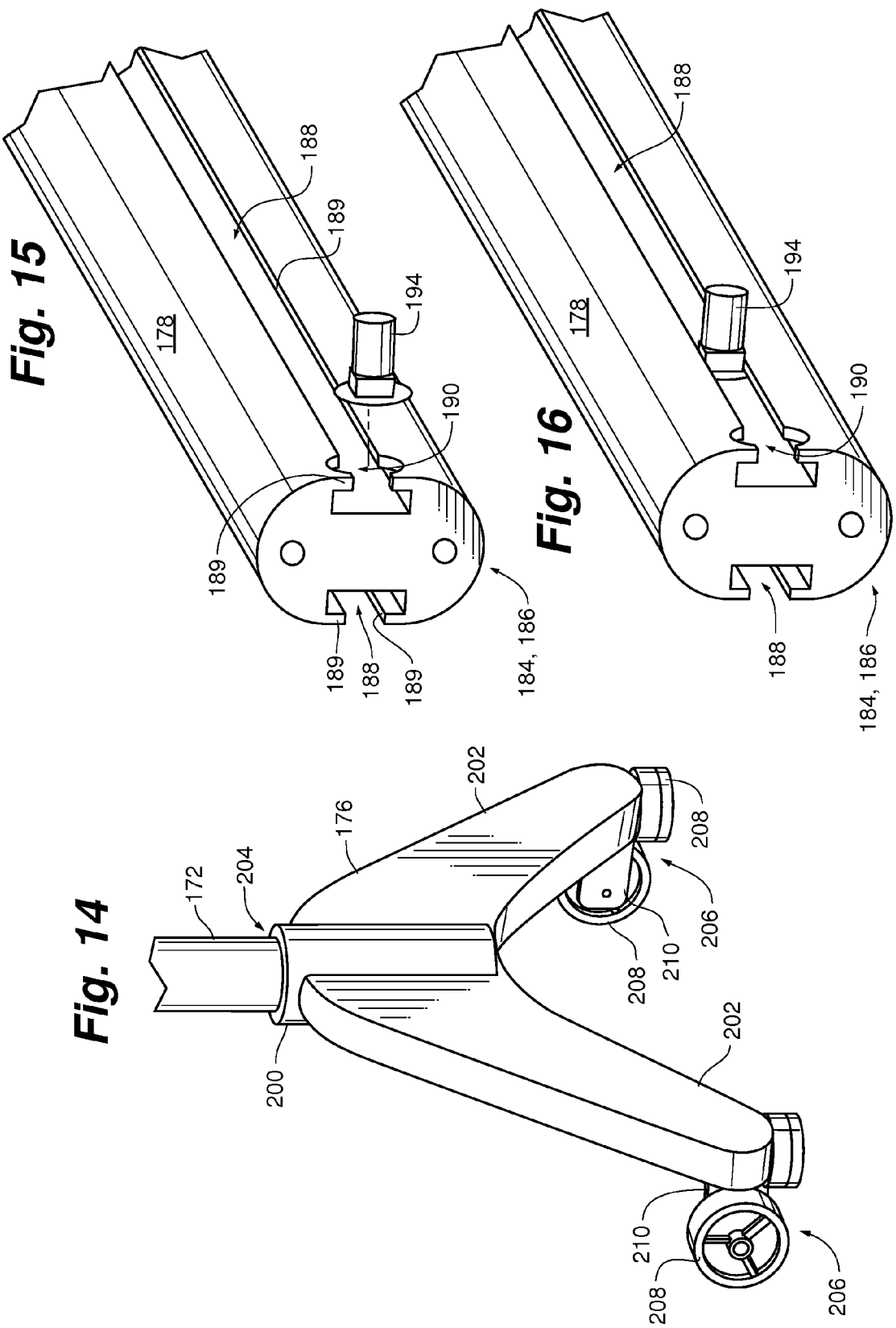

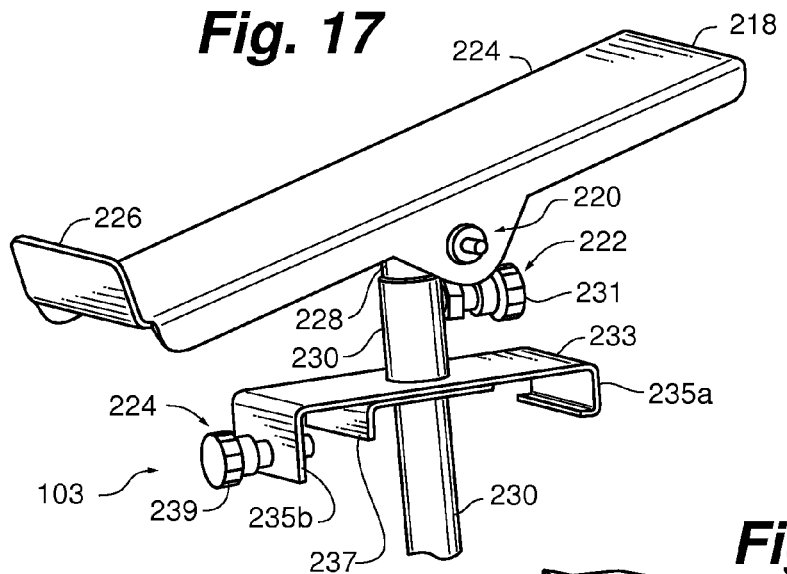
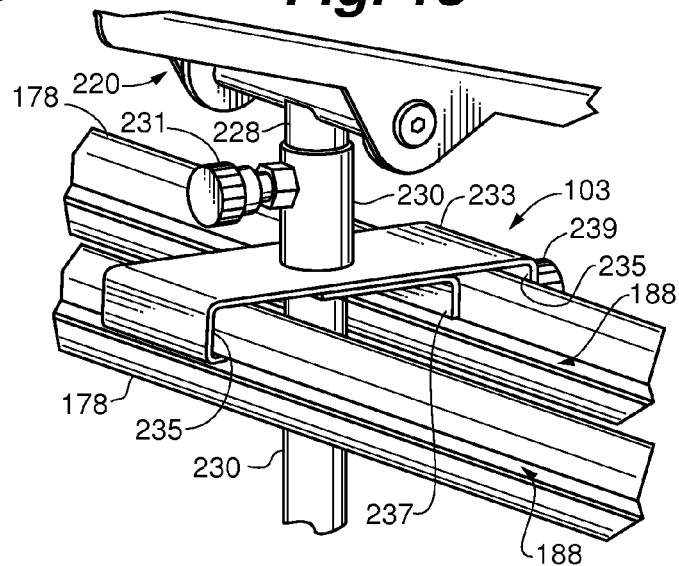
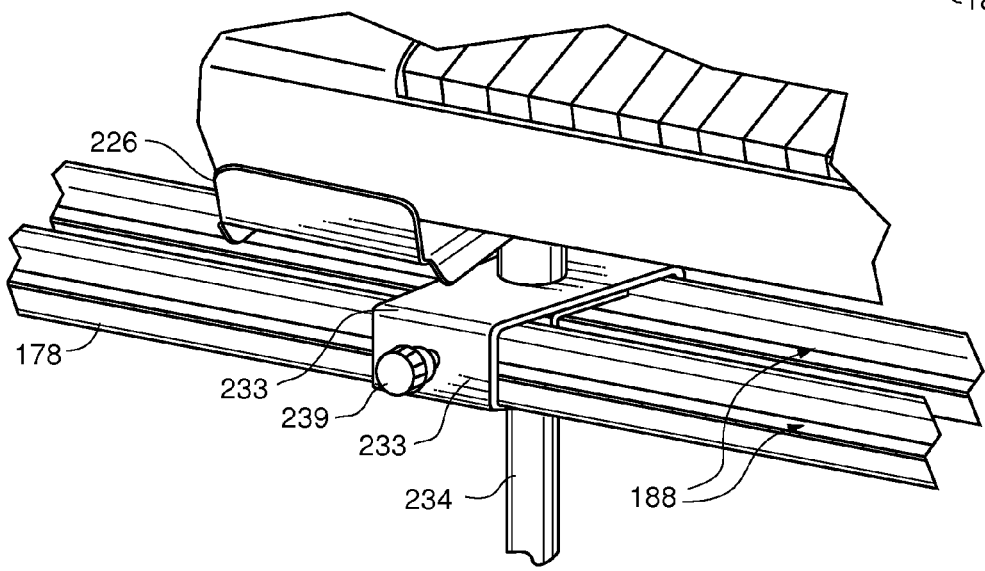

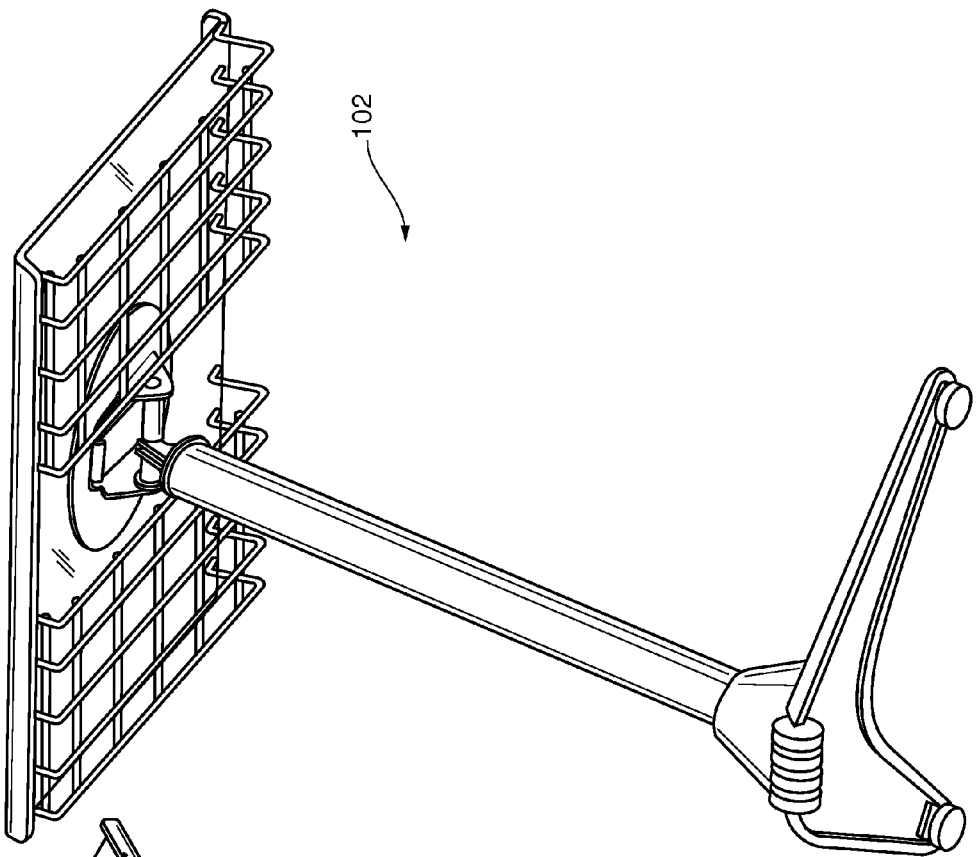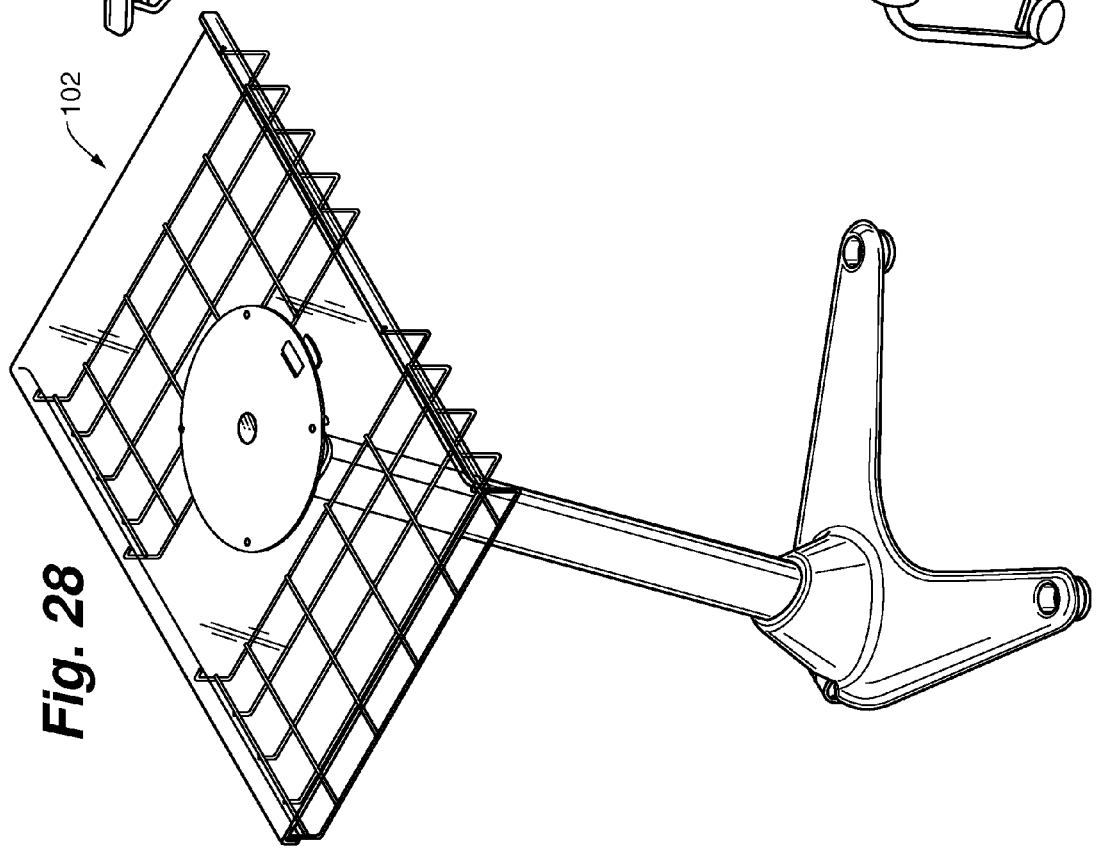

*Fig. 34*
*Fig. 35*
*Fig. 36*
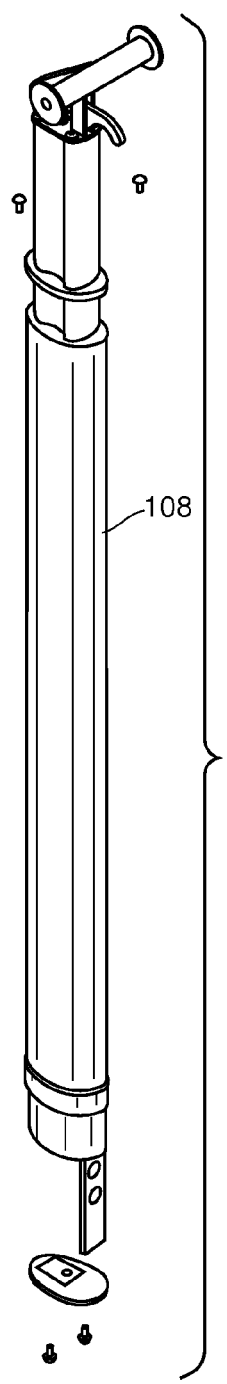
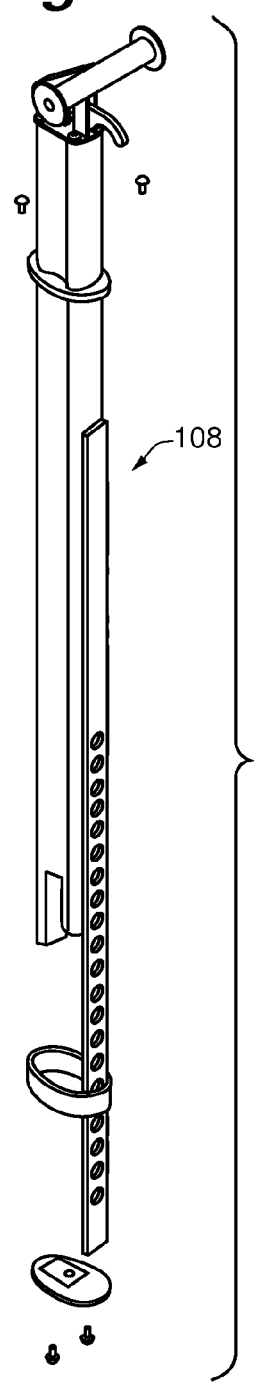
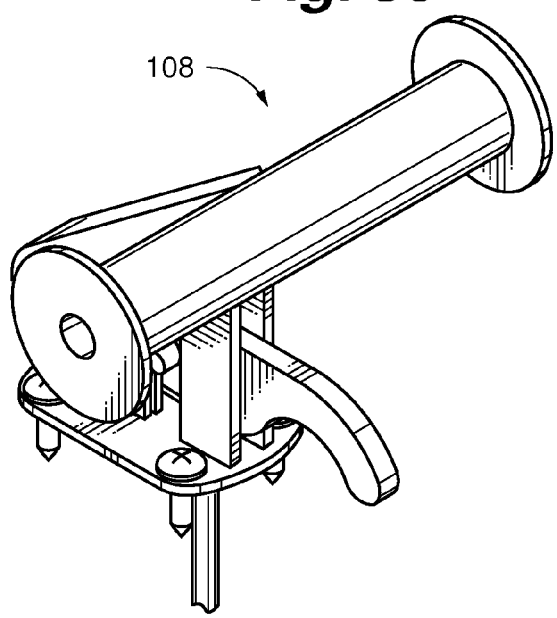

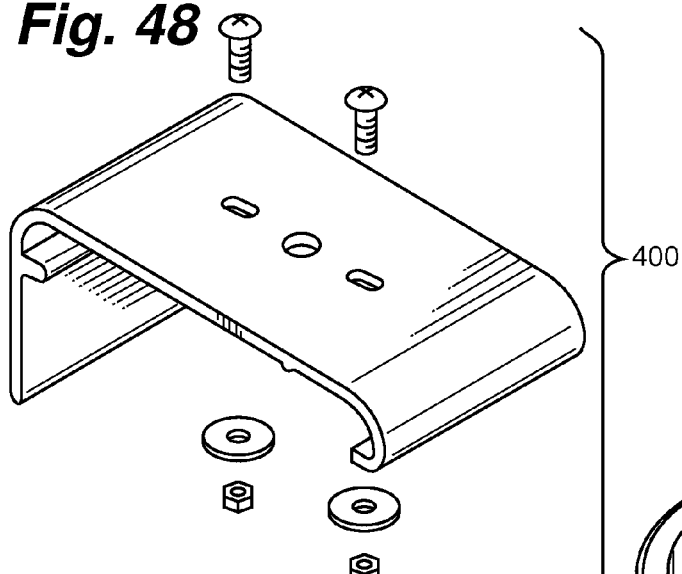
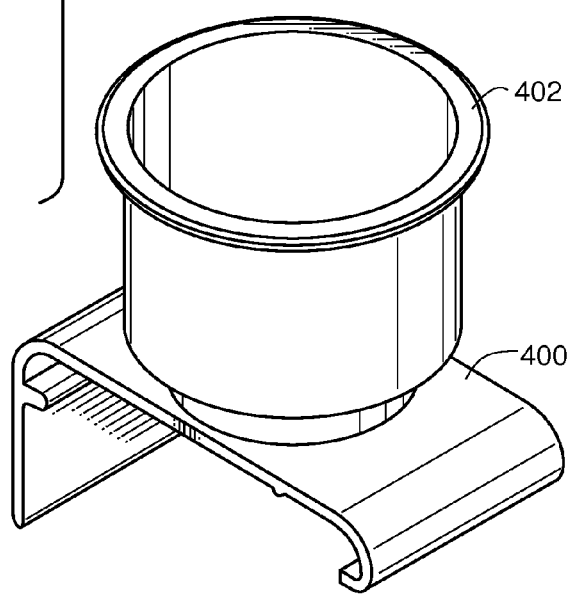
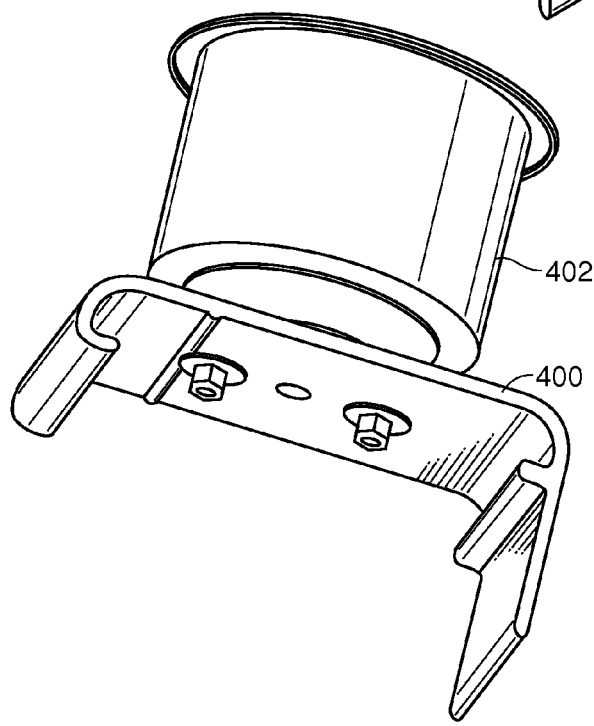

CONDUCTOR SYSTEM

RELATED APPLICATIONS

This application is a continuation of application Ser. No. 12/844,522 filed Jul. 27, 2010, which claims the benefit of U.S. Provisional Application No. 61/228,926 filed Jul. 27, 2009 and U.S. Provisional Application No. 61/285,476 filed Dec. 10, 2009, each of which is hereby fully incorporated herein by reference.

TECHNICAL FIELD

The present disclosure relates generally to conductor stands. More specifically, the present disclosure relates to a modular conducting system that can readily be assembled and disassembled to provide enhanced adjustability and accessorization by a user, facilitate maneuverability, and promote the use of traditional print music methods as well as digital and electronic music methods.

BACKGROUND

Podiums are often used by educators, performers, conductors, and others to perform, practice, teach, record, and direct music and other disciplines. At times, the user of a podium may desire to have access to electronic media or a musical instrument while stationed at the podium. Currently, there are inadequate solutions for integrating podiums and accessory stands in a manner that facilitates a user's ability to optimally position a plurality of accessories and implements, provides for ease of assembly, disassembly, and maneuverability, and exhibits stability.

In particular, current podium and accessory stands require a cumbersome configuration process and can be extremely difficult to set up, take apart, and transport. For example, a user stationed in front of a podium who desires to have access to a laptop computer or an electronic keyboard will often need to reposition themself from station to station to use the respective accessories. If the user wishes to reposition the laptop or electronic keyboard, the entire stand must be repositioned. This can result in an undesirable interruption in the user's presentation and unnecessary delay, which may have adverse effects upon an audience. In addition, the difficulty of such maneuvering can detract from the overall flow of a presentation established by the user. Therefore, there is a need in the industry for an improved conductor system that addresses the aforementioned drawbacks.

Systems under the current state of the art typically include collections of separate, non-integrated pieces, such as computer carts, podiums, and racks for instruments. The resulting array of individual pieces lacks continuity, aesthetic value, and the inherent structure to handle the daily abuse that accompanies heavy classroom, rehearsal, or performance use, including set-up and take-down.

Current systems may also be inefficient or ineffective in providing for adjustment or customization in accordance with the preferences of a user. In particular, users often wish to fine tune the positioning of the implements and accessories for which a podium and stand provide support. Such individualized preferences may demand minute or incremental adjustment of the height, tilt or pitch, and lateral placement of individual components. Current systems often fail to provide such customization without having to adjust the overall system or only provide for a limited range of adjustments. As a result of these drawbacks, the user may have to sit or stand in significantly different locations in order to switch between implements and accessories. Such limitations can tire a user and detract from the overall presentation by requiring unnecessary movement and time. Such drawbacks are often exacerbated with the frequent use of digital and other electronic equipment such as, for example, computers, monitors, and keyboards.

Another drawback of current systems is an inability to support multiple types of accessories. For example, many racks are designed to accommodate only a keyboard, or only instruments of a specific size. As a result, users must often accumulate a variety of different racks for various instruments and/or machines, thereby increasing overall expense and consuming additional space.

The process of assembling, disassembling, and transporting current systems also presents a number of drawbacks. For example, many racks utilize highly user-intensive locking and securing mechanisms. These add time and complexity to setup and takedown. Quick-release or single-handed-use locking mechanisms would be a great improvement to existing methods. In addition, the weight of the various components can present significant obstacles to the overall maneuverability of the system.

Therefore, there exists in a need in the industry for an improved system that enhances acute adjustability while maintaining stability and providing adequate adjustability.

SUMMARY OF THE INVENTION

Embodiments of the conductor system of the present application substantially meet the aforementioned needs of the industry. In an embodiment, a conductor system includes a rack that can be coupled to a podium, the rack and the podium being adjustable in accordance with the preferences of a user. A plurality of racks can also be coupled to the podium to form a conductor system according an embodiment of the present invention. Multiple racks can be coupled together according to another embodiment of the present invention.

Each rack is selectively radially positionable in relation to the podium. The height of the rack is selectively adjustable in relation to the floor. At least one of the legs is infinitely, slidably adjustable along the length of the rack. The rack may further include an accessory attachment device that is also infinitely, slidably adjustable along the length of the rack.

The height of the podium is selectively adjustable in relation to the floor. The shelf of the podium is infinitely tiltable with a range to present a primary surface at a desired pitch. The shelf of the podium is also rotatable in relation to a base of the podium.

A conductor system according to embodiments can thereby provide a user with the ability to occupy a location and access devices or accessories coupled to respective components without substantially readjusting the user's location or the positioning of the conductor system. The conductor system can also improve assembly, disassembly, and maneuverability.

In an embodiment, the podium includes a telescoping column coupled to a base and a shelf, and the rack includes at least two telescoping legs and a platform. Positioning and transporting the rack and the podium do not require that the rack or the podium be completely removed from the ground. The respective bases of the podium and the rack may provide additional stability through the geometric configuration of the bases and a disproportionate distribution of weight of the conductor system to the bases. One of the legs of the rack may be coupled to the base of the podium. The other leg may be slidably postionable along a platform of the rack. An accessory attachment device may also be slidably positionable along the platform of the rack. The accessory attachment device may be adapted to receive a user accessory, such as, for example, a laptop or keyboard, such that the user's accessory is adjustable by the user.

BRIEF DESCRIPTION OF THE DRAWINGS

FIG. 5 is a front perspective view of a podium of a conductor system according to an embodiment.

FIG. 6 is a side perspective view of a podium of a conductor system according to an embodiment.

FIG. 14 is a partial perspective view of a rack base of a conductor system according to an embodiment.

FIG. 15 is a partial perspective view of a rack cross member of a conductor system according to an embodiment.

FIG. 16 is a partial perspective view of a rack cross member of a conductor system according to an embodiment.

FIG. 17 is a partial perspective view of an accessory attachment device of a conductor system according to an embodiment.

FIG. 18 is a partial perspective view of an accessory attachment device of a conductor system according to an embodiment.

FIG. 19 is a perspective view of an accessory attachment device of a conductor system according to an embodiment.

FIG. 28 is a front perspective view of a podium of a conductor system according to an embodiment.

FIG. 29 is rear perspective view of a podium of a conductor system according to an embodiment.

FIG. 34 is an exploded perspective view of a column of a podium of a conductor system according to an embodiment.

FIG. 35 is an exploded perspective view of various components of a column of a podium of a conductor system according to an embodiment.

FIG. 36 is a partial perspective view of various components of a column of a podium of a conductor system according to an embodiment.

FIG. 48 is a perspective view of an accessory attachment bracket of a conductor system according to an embodiment.

FIG. 49 is a perspective view of an accessory attachment bracket with a cup holder mount of a conductor system according to an embodiment.

FIG. 50 is perspective view of an accessory attachment bracket with a cup holder mount of a conductor system according to an embodiment.

Figure 1:
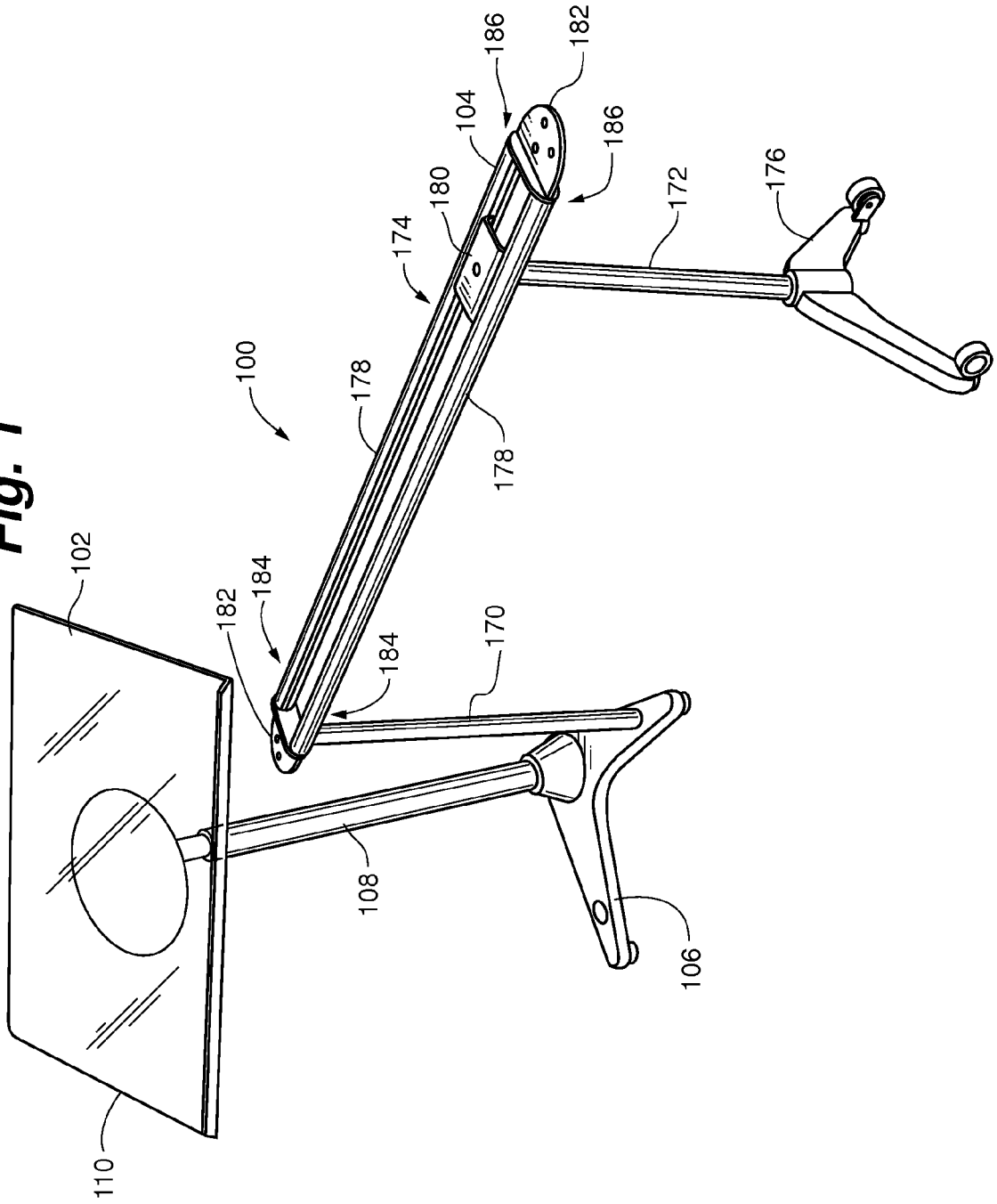
FIG. 1 is a front perspective view of a conductor system according to an embodiment.
Figure 2:
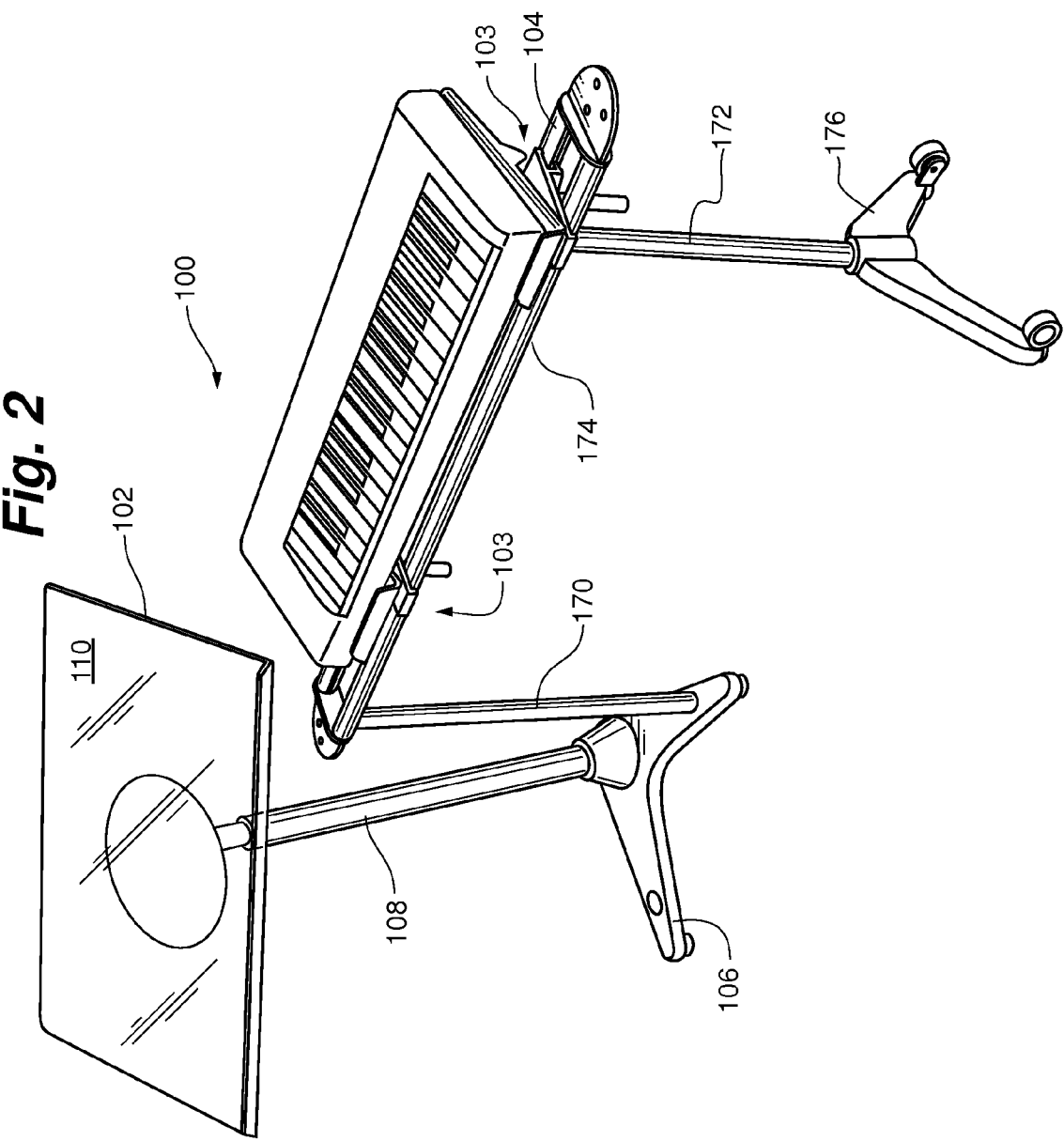
FIG. 2 is a front perspective view of a conductor system according to an embodiment.
Figure 3:
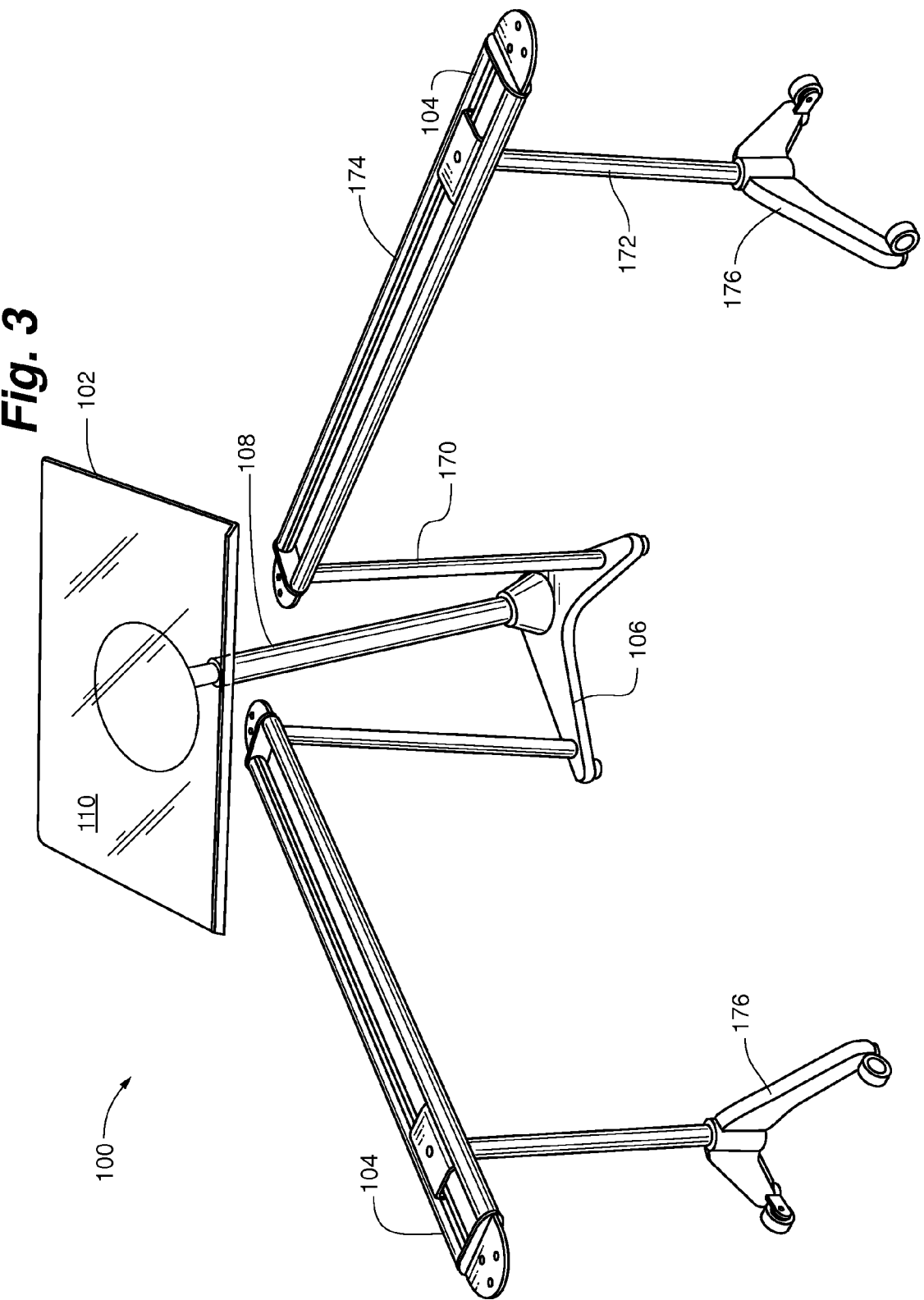
FIG. 3 is a front perspective view of a conductor system according to an embodiment.

While embodiments of the invention are amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION OF THE DRAWINGS

A conductor system according to an embodiment is depicted generally in FIG. 1 with reference numeral 100. Although conductor system 100 may be used for any number of purposes, conductor system 100 can be used to facilitate teaching or directing according to an embodiment. The conductor system 100 may be particularly useful in allowing music teachers to accommodate the use of technology into their classrooms or during rehearsals.

Figure 4:
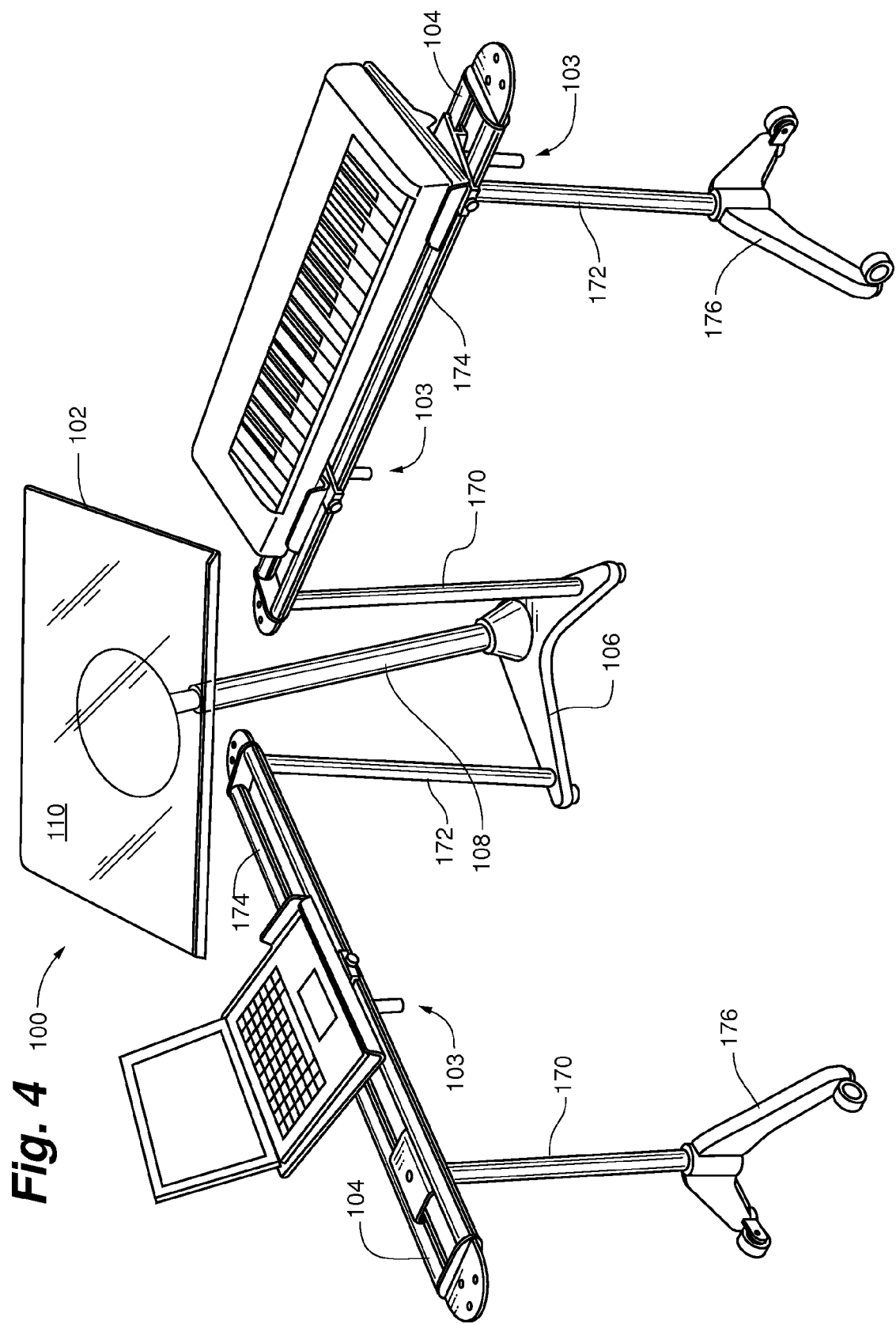
FIG. 4 is a front perspective view of a conductor system according to an embodiment.

Referring to FIGS. 1-4, conductor system 100 generally includes podium 102 and at least one rack 104. Conductor system 100 may also include accessory attachment device 103. Conductor system 100 may include a plurality of racks 104. In an embodiment, conductor system 100 includes two racks, as depicted in FIGS. 4-6.

Figure 7:
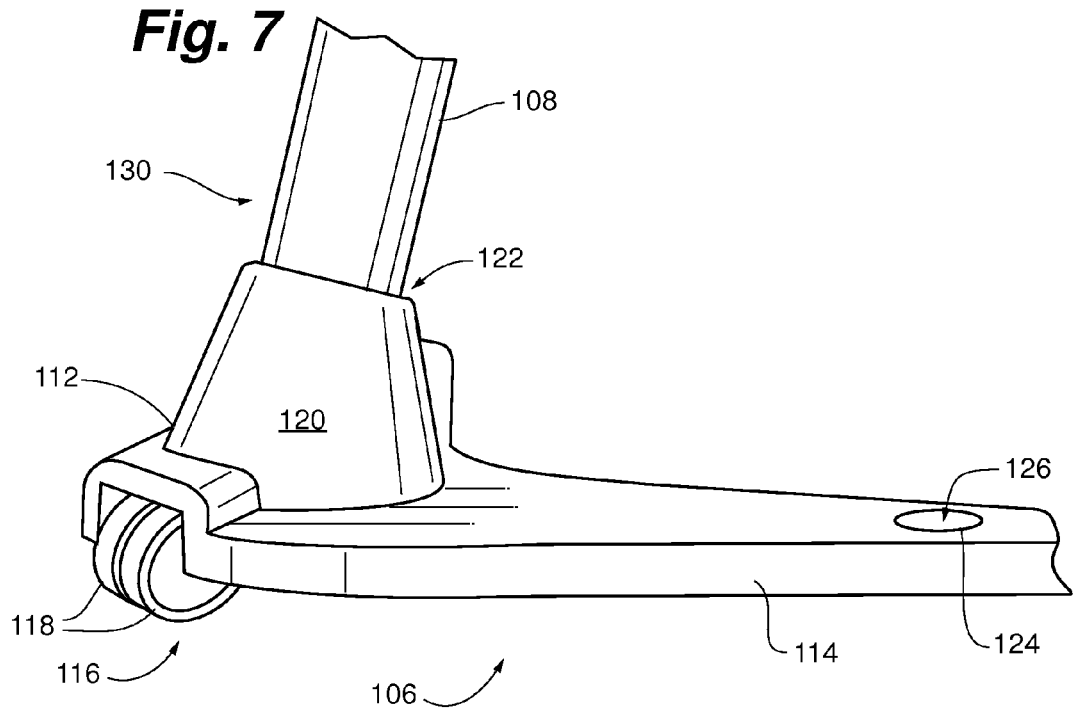
FIG. 7 is a partial side perspective view of a podium base of a conductor system according to an embodiment.
Figure 8:
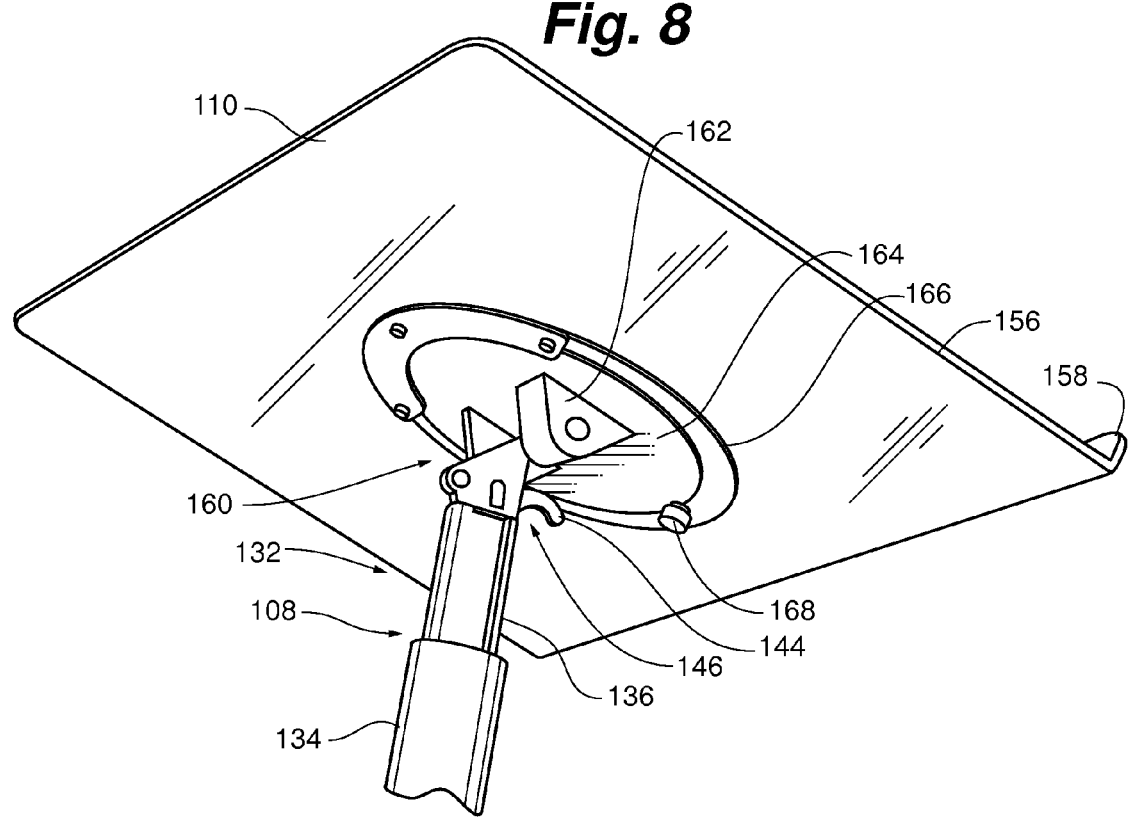
FIG. 8 is a partial bottom perspective view of a podium shelf of a conductor system according to an embodiment.
Figure 11:
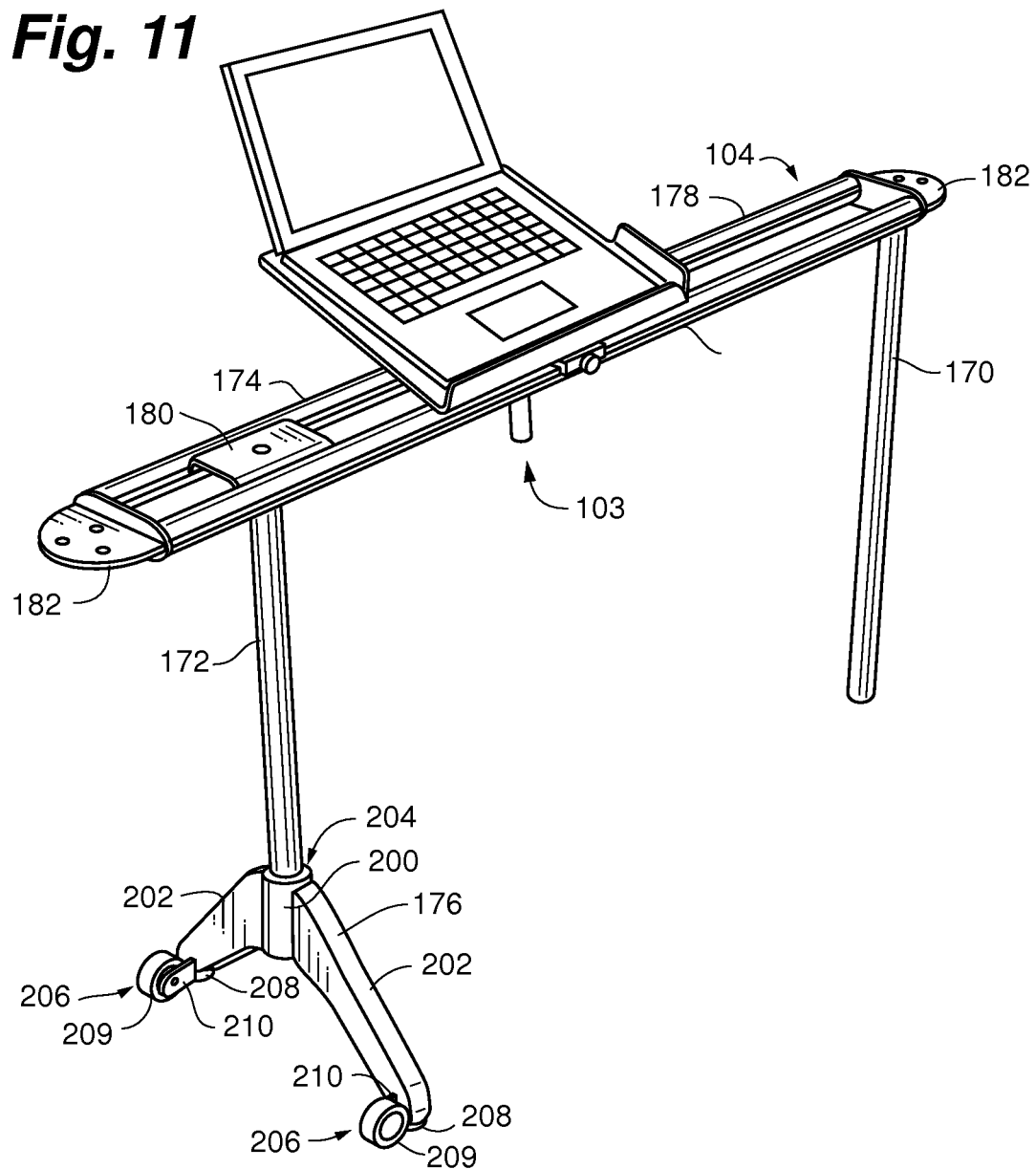
FIG. 11 is a front perspective view of a rack of a conductor system according to an embodiment.
Figure 12:
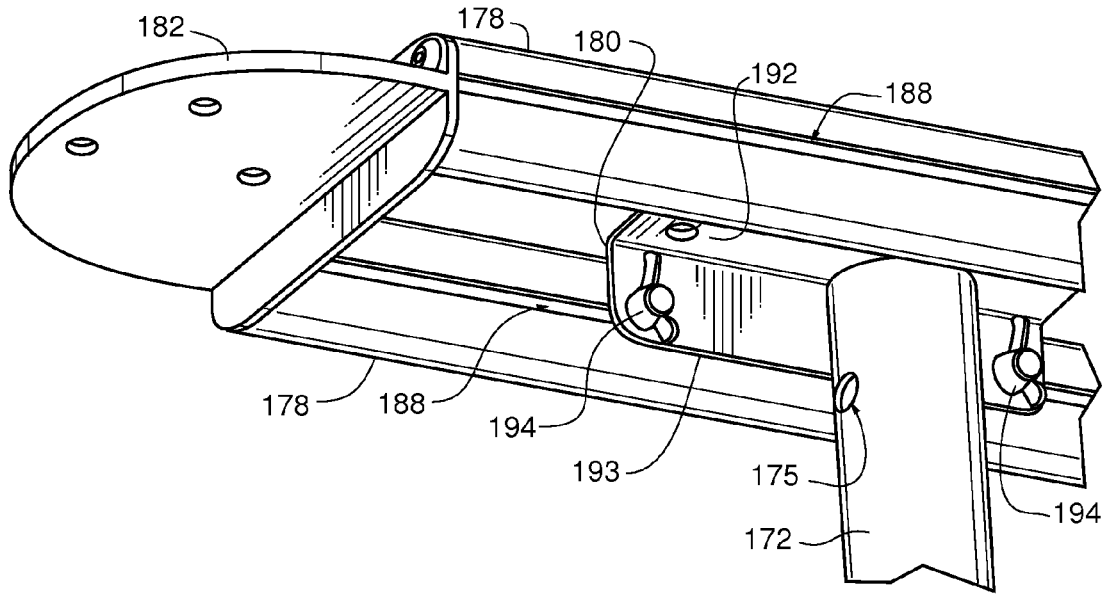
FIG. 12 is a partial bottom perspective view of a rack of a conductor system according to an embodiment.

Referring to FIGS. 5-6, podium 104 includes base 106, column 108, and shelf 110. Referring to FIG. 7, base 106 has main support section 112. Base 106 may also include support arms 114. Base 106 may have any number of support arms 114, but generally has two support arms 114 according to an embodiment. Base 106 may also have wheel system 116, as depicted in FIGS. 11-12. In an embodiment, wheel system 116 has one wheel 118 attached to base 106. In another embodiment, wheel system 116 has two wheels 118, as depicted in FIG. 7. Wheel system 116 may include additional wheels 118 in various embodiments.

Main support section 112 may include column retainer 120. Column retainer 120 defines aperture 122 in an embodiment. Each support arm generally includes leg retainer 124. Each leg retainer 124 defines channel 126. Although the accompanying figures generally depict only one leg retainer 124, support arms 114 may include a plurality of leg retainers 124. Each support arm 114 may also include stop 128.

Referring to FIGS. 5-6 and 13-15, column 108 has base end 130 and shelf end 132. Column 108 includes outer mast 134, inner mast 136, telescoping mechanism 138, and shelf bracket 140. Outer mast 134 may have at least one slot 142. In an embodiment, outer mast 134 defines a plurality of slots 142. Telescoping mechanism 138 includes trigger 144, latch plate 146, and connecting rod 147. Trigger 144 may have user-engagement structure 148 and define trigger aperture 150. Latch plate 146 may include engagement member 152 and define latch plate aperture 154. As depicted in FIG. 15, latch plate 146 may define a plurality of apertures 154.

Referring to FIGS. 5-6 and 8-9, shelf 110 includes primary surface 156, secondary surface 158, and positioning mechanism 160. Positioning mechanism 160 generally includes column bracket 164. Positioning mechanism 160 may also include first swivel plate 166, a second swivel plate, and swivel knob 168.

Referring to FIGS. 1-4 and 10-13, rack 104 generally includes at least two legs 170, 172 and platform 174. Rack 104 may also include base 176 and coupling member 182. Each leg 170, 172 may have outer leg 169 and inner leg. Legs 170, 172 may also include retainer 171 and cap 173. Outer leg 169 and inner leg may define apertures 175. Retainer 171 generally has peg 175, clip 177, and handle 179.

Figure 13:
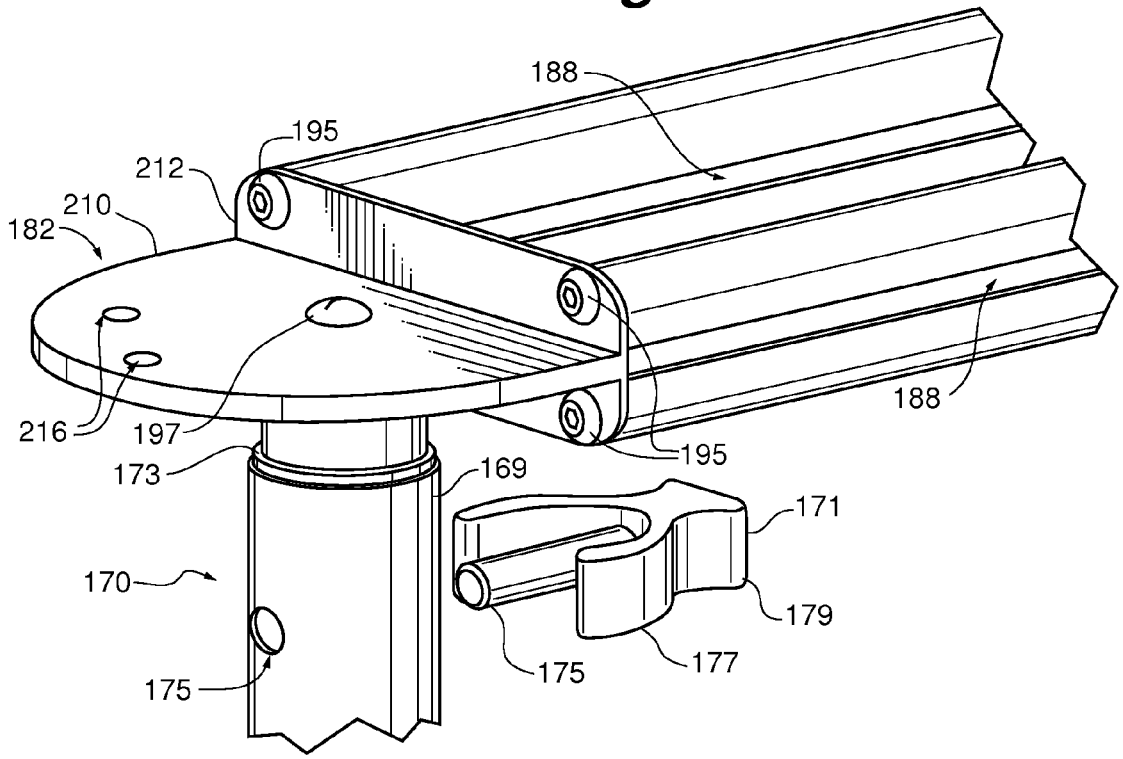
FIG. 13 is partial perspective view of a rack leg of a conductor system according to an embodiment.
Figure 20:
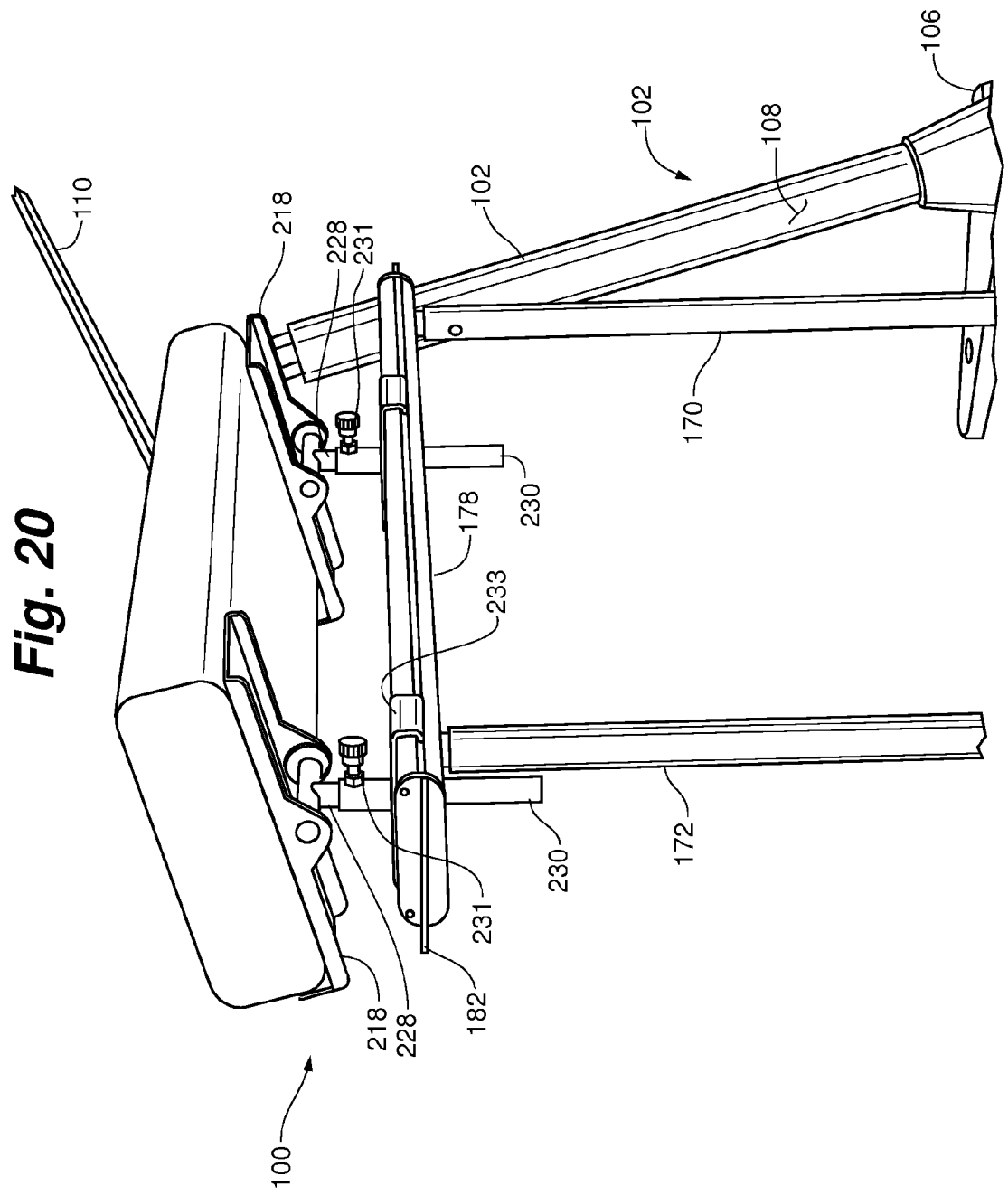
FIG. 20 is a partial rear perspective view of an accessory attachment device of a conductor system according to an embodiment.

In an embodiment, platform 174 includes cross members 178 and attachment bracket 180. Cross members 178 have first end 184 and second end 186. Each cross member 178 generally defines at least one slide channel 188 with opposing lips 189. Each cross member 178 may define two slide channels 188, as depicted in FIGS. 13-14. Each cross member 178 may further define fastening member opening 190 proximal first end 184 or second end 186. Attachment bracket 180 may include body 192, flanges 193, and fastening members 194. Attachment bracket 180 may also include a leg insert and a locking mechanism in an embodiment. Attachment bracket 180 generally defines a plurality of apertures (not shown) and attachment structure (not shown).

Base 176 generally includes leg support section 200 and stabilizing legs 202. Leg support section 200 defines channel 204. Each leg support section 200 may have wheel assembly 206 and stop 208. Wheel assembly 206 generally includes wheel 208 and wheel extension 210.

Coupling member 182 generally includes flange 210 and mating structure 212. Coupling member 182 may also define a plurality of apertures 216.

Referring to FIGS. 17-20, accessory attachment device 103 includes shelf 218, tilting mechanism 220, height adjustment mechanism 222, and coupling mechanism 224 in an embodiment. Shelf has primary surface 224 and secondary surface 226. Height adjustment mechanism 222 has inner tube 228, outer tube 230, and locking knob 231. Coupling mechanism 224 has plate 233 with outer guides 235 and inner guide 237. Coupling mechanism 224 has locking knob 239.

Figure 51:
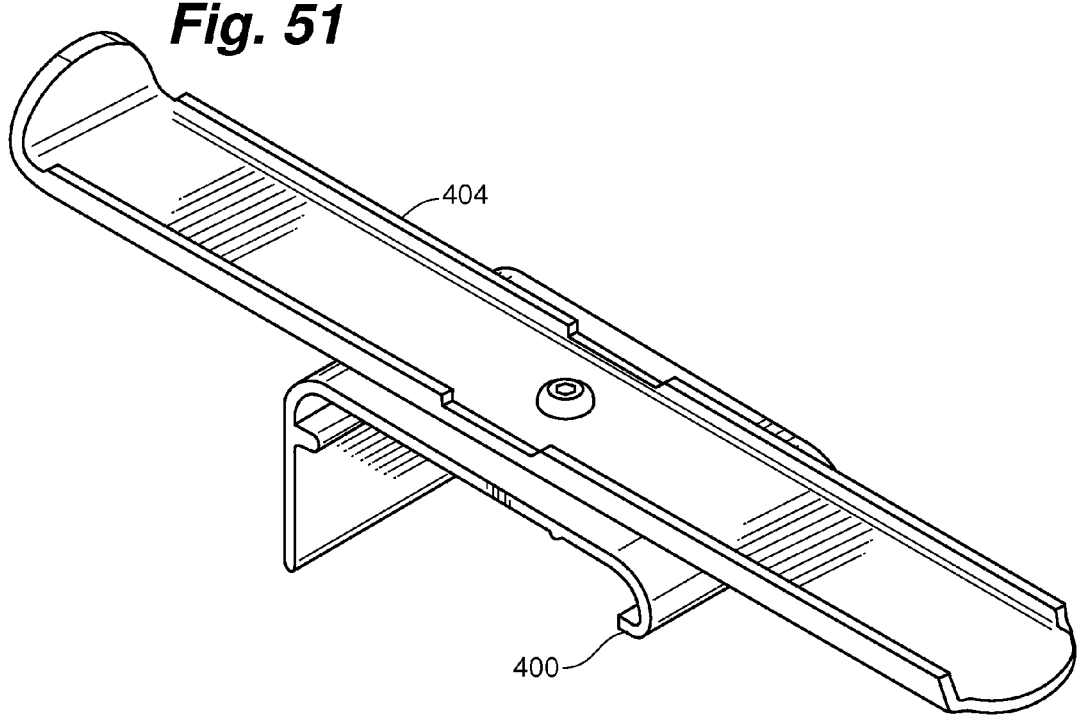
FIG. 51 is a perspective view of an accessory attachment bracket with a keyboard mount of a conductor system according to an embodiment.
Figure 52:
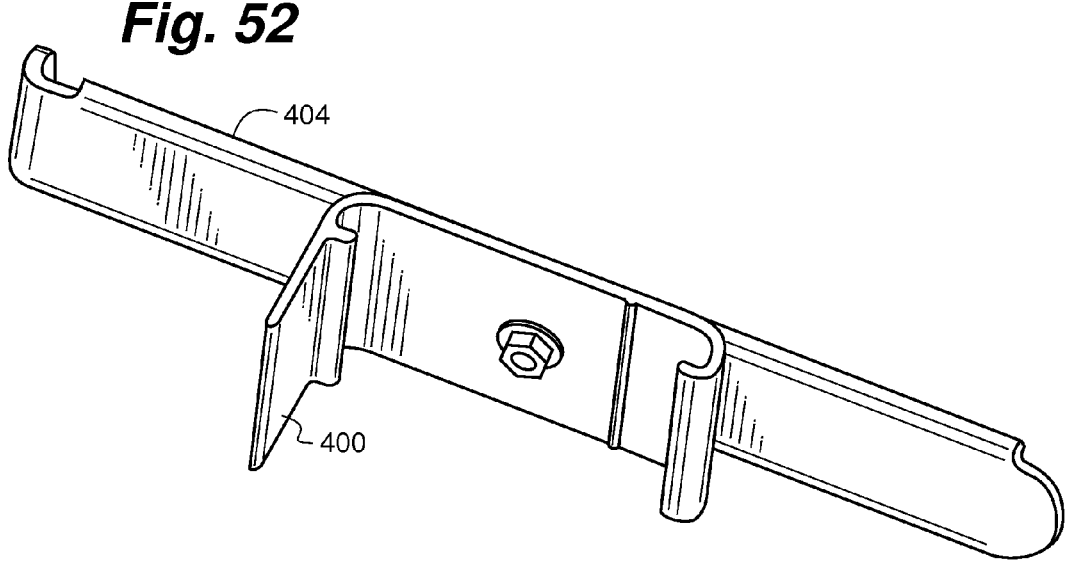
FIG. 52 is a perspective view of an accessory attachment bracket with a keyboard mount of a conductor system according to an embodiment.
Figure 53:
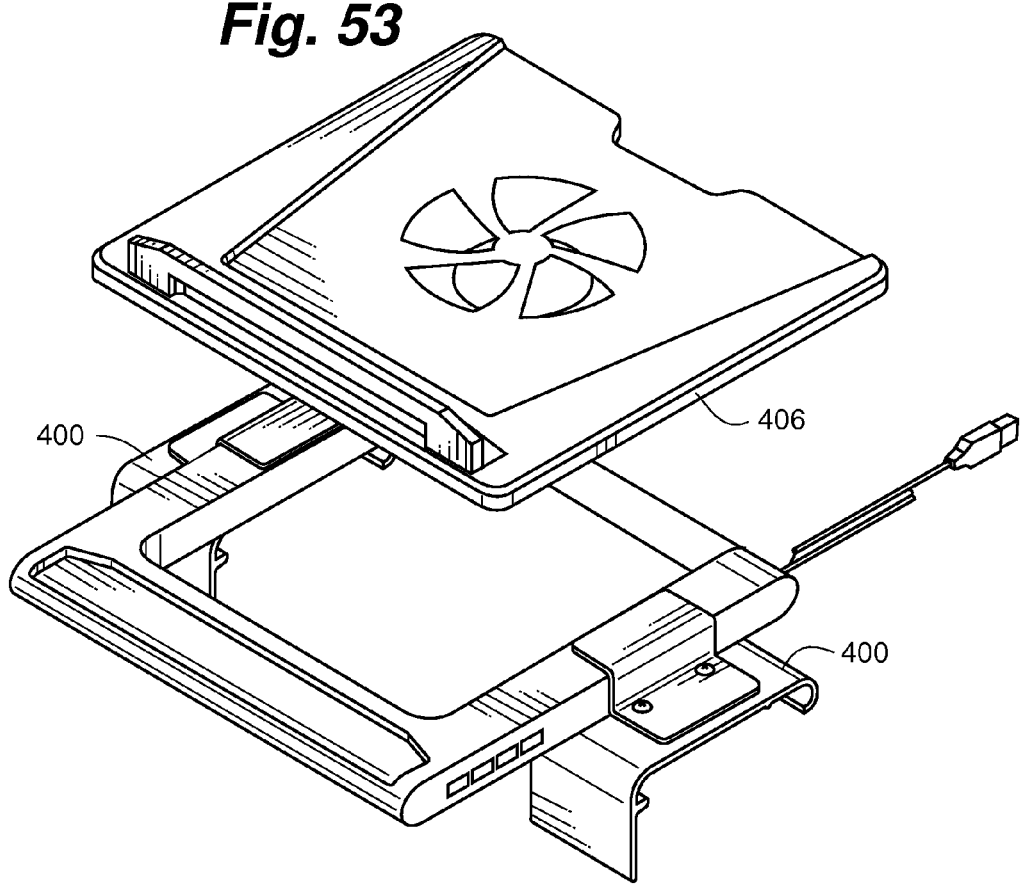
FIG. 53 is a perspective view of accessory attachment brackets with a laptop mount of a conductor system according to an embodiment.
Figure 54:
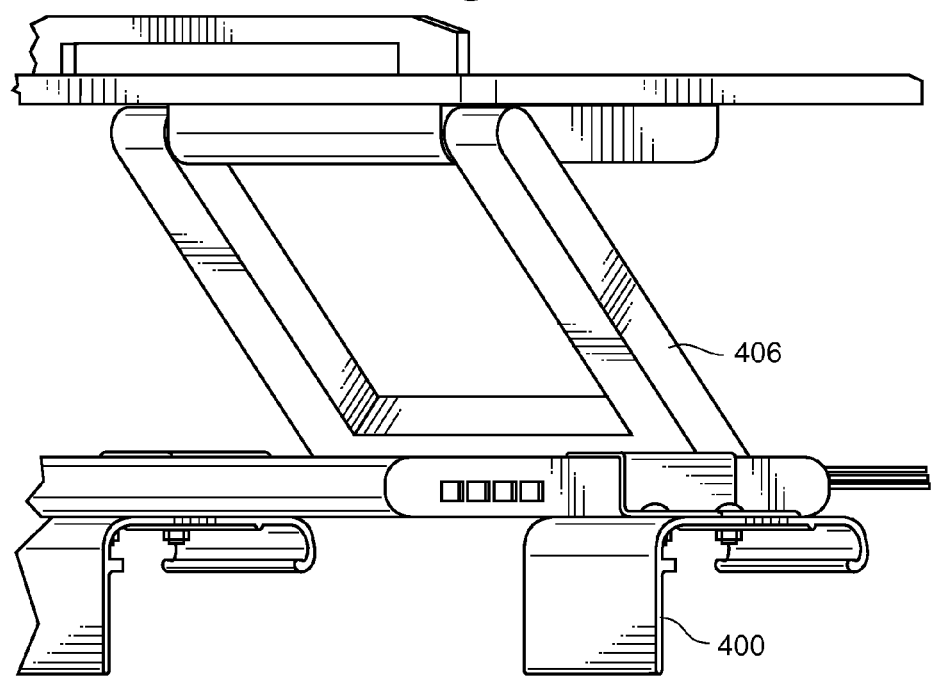
FIG. 54 is a perspective view of accessory attachment brackets with a laptop mount of a conductor system according to an embodiment.
Figure 55:
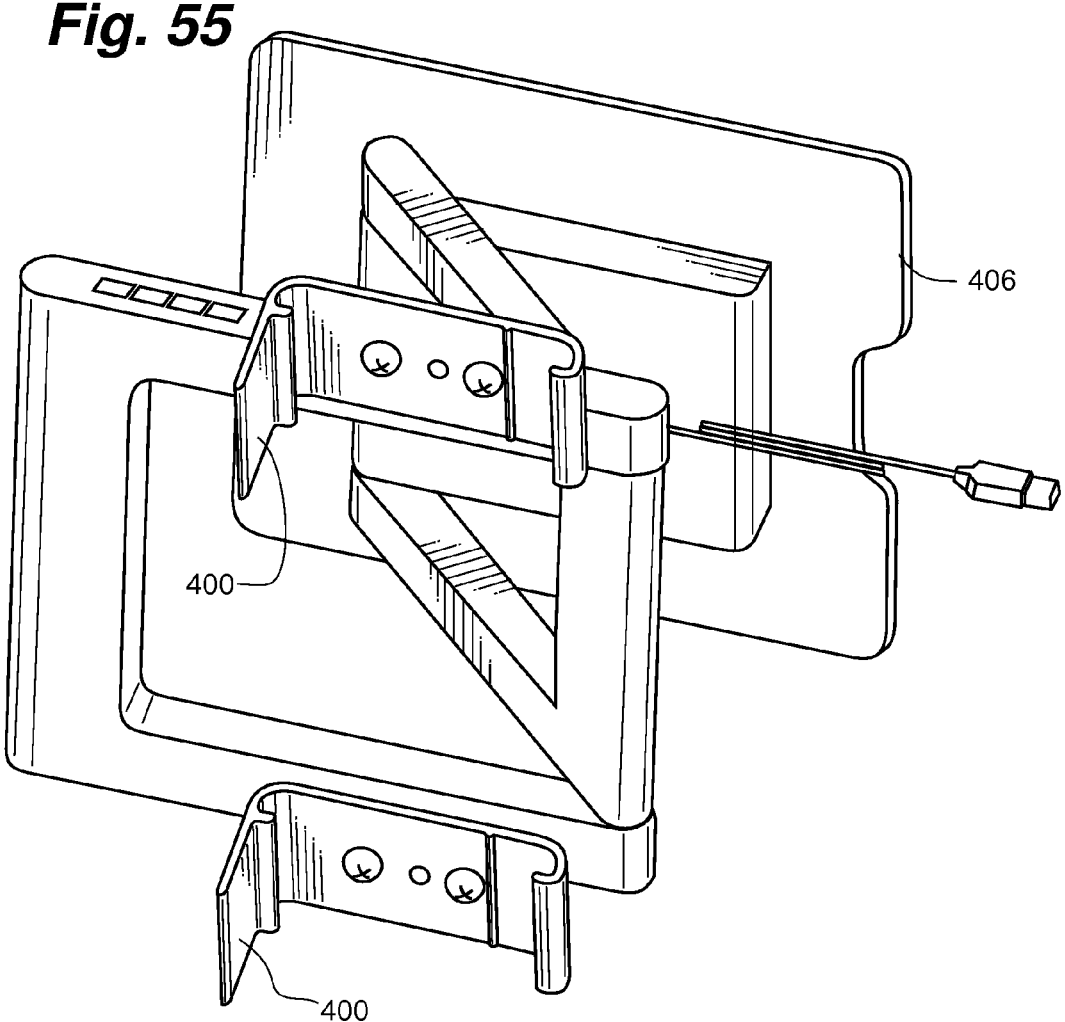
FIG. 55 is a perspective view of accessory attachment brackets with a laptop mount of a conductor system according to an embodiment.
Figure 56:
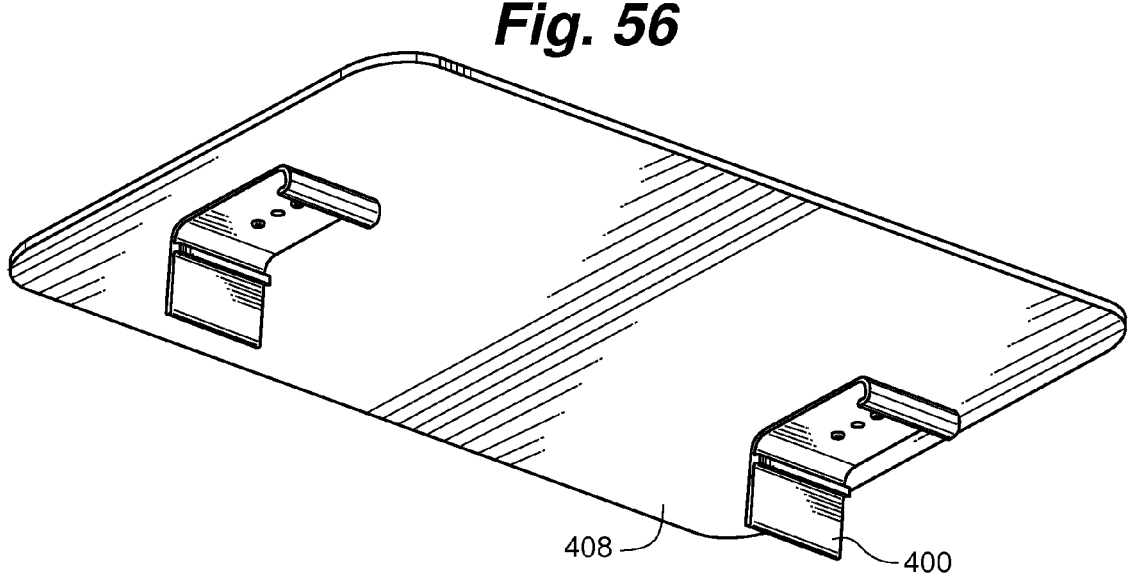
FIG. 56 is a perspective view of accessory attachment brackets according to an embodiment.
Figure 57:
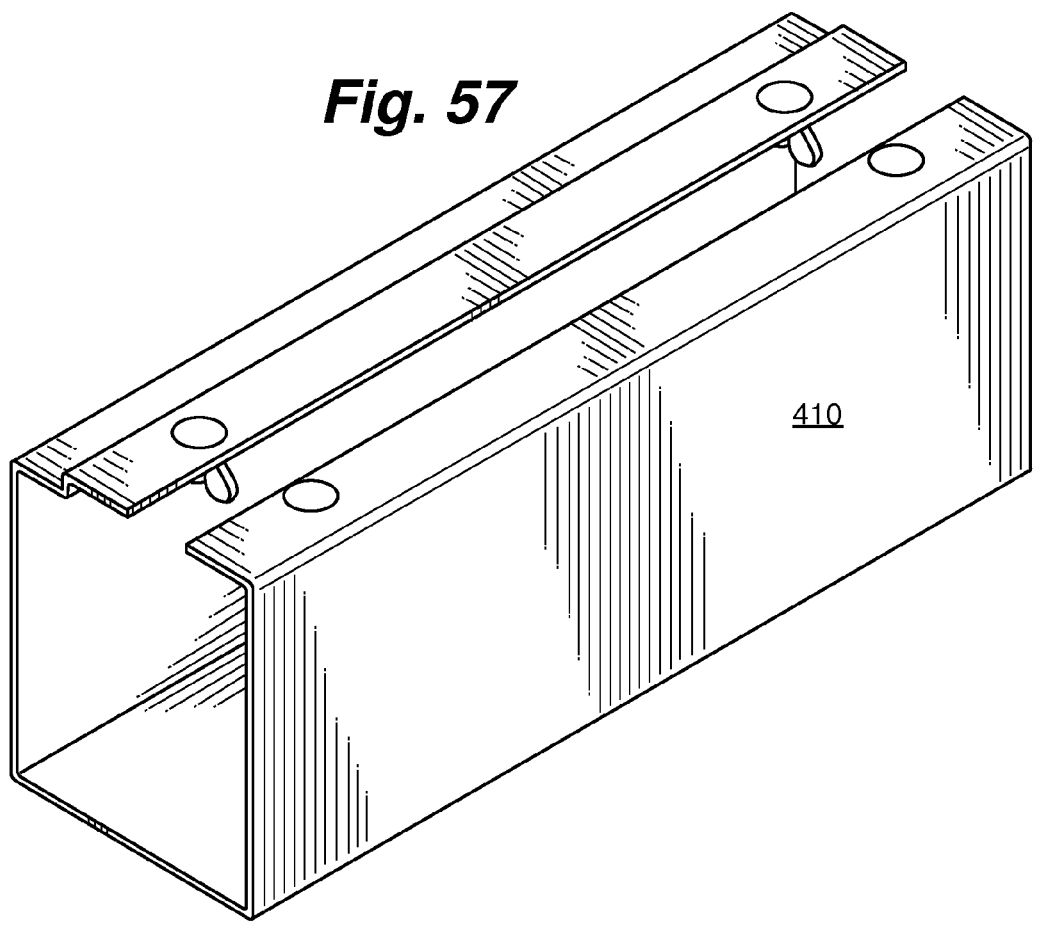
FIG. 57 is a perspective view of a cable management attachment according to an embodiment.
Figure 58:
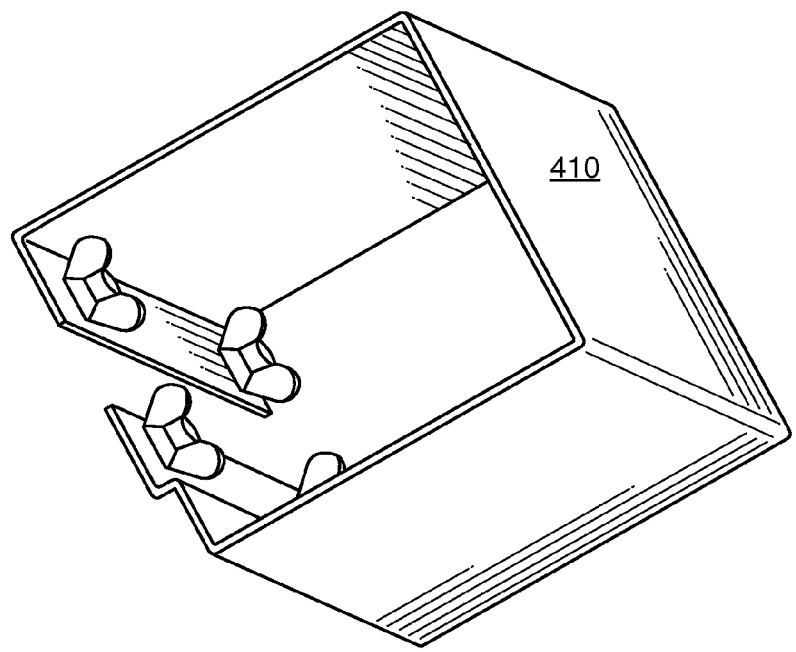
FIG. 58 is a perspective view of a cable management attachment according to an embodiment.

Referring to 48, conductor system 100 may also include accessory attachment bracket 400. Accessory attachment bracket 400 may be coupled to platform 174 of rack 104. In use, accessory attachment bracket 400 may be used to attach any number of items to rack. In an embodiment, accessory attachment bracket 400 can be used to attach cup holder 402 to rack 104, as depicted in FIGS. 49-50. In another embodiment, accessory attachment bracket 400 can be used to attach keyboard mount 404 to rack 104, as depicted in FIGS. 51-52. In a further embodiment, accessory attachment bracket 400 can be used to attach laptop mount 406 to rack 104, as depicted in FIGS. 53-55. In yet another embodiment, accessory attachment bracket 400 can be used to attach workdesk mount 408, as depicted in FIG. 56. Conductor system 100 may also include cable management attachment 410, as depicted in FIGS. 57-58.

In operation, rack 104 can be coupled to podium 102 to form conductor system 100. One skilled in the art will recognize that conductor system 100 may include any number of podiums 102 and racks 104 in various embodiments. For example, podium 102 could be coupled to rack 104, which could connect to another podium 102, which could be coupled to another rack 104, and so on. Alternatively, a first rack 104 could be coupled to another rack 104 to form a chain of racks 104.

Aspects relating to the assembly and disassembly of conductor system 100 will now be described. One skilled in the art will readily recognize that the steps described with respect to assembly of conductor system 100 can be reversed to disassemble conductor system 100. One skilled in the art will also readily recognize that assembly or disassembly of conductor system 100 is not limited by the order in which the following steps are presented. The steps can be mixed and matched in accordance with user preference and are not presented in any particular order.

Podium 102 can generally be positioned into a desired location by a user. To position podium 102, podium 102 can be tilted about wheel 118 or wheels 118 of wheel system 116 into a transport position. For example, a user can push or pull on shelf 110 such that wheel 118 or wheels 118 engage the ground and column 108 rotates about wheel 118 or wheels 118. Podium 102 can then be rolled into a desired position and tilted back into a performance position such that wheel 118 or wheels 118 are disengaged from the ground. In an embodiment, the bottom of wheel 118 or wheels 118 are approximately 1/16 inch above the ground in the performance position. In this manner, podium 102 can be repositioned by a user with having to be lifted off the ground.

Figure 9:
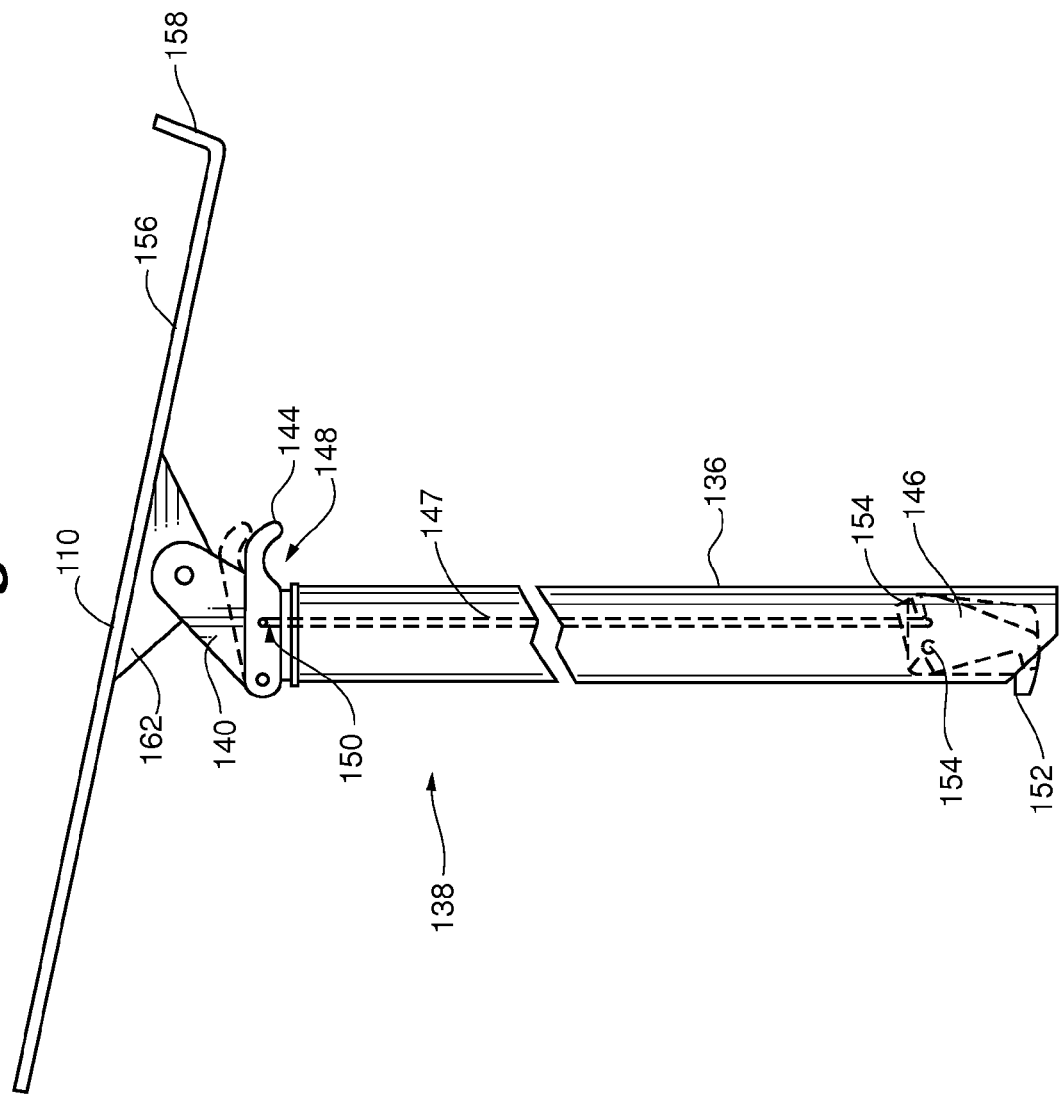
FIG. 9 is a side elevational view of a podium of a conductor system according to an embodiment.
Figure 10:
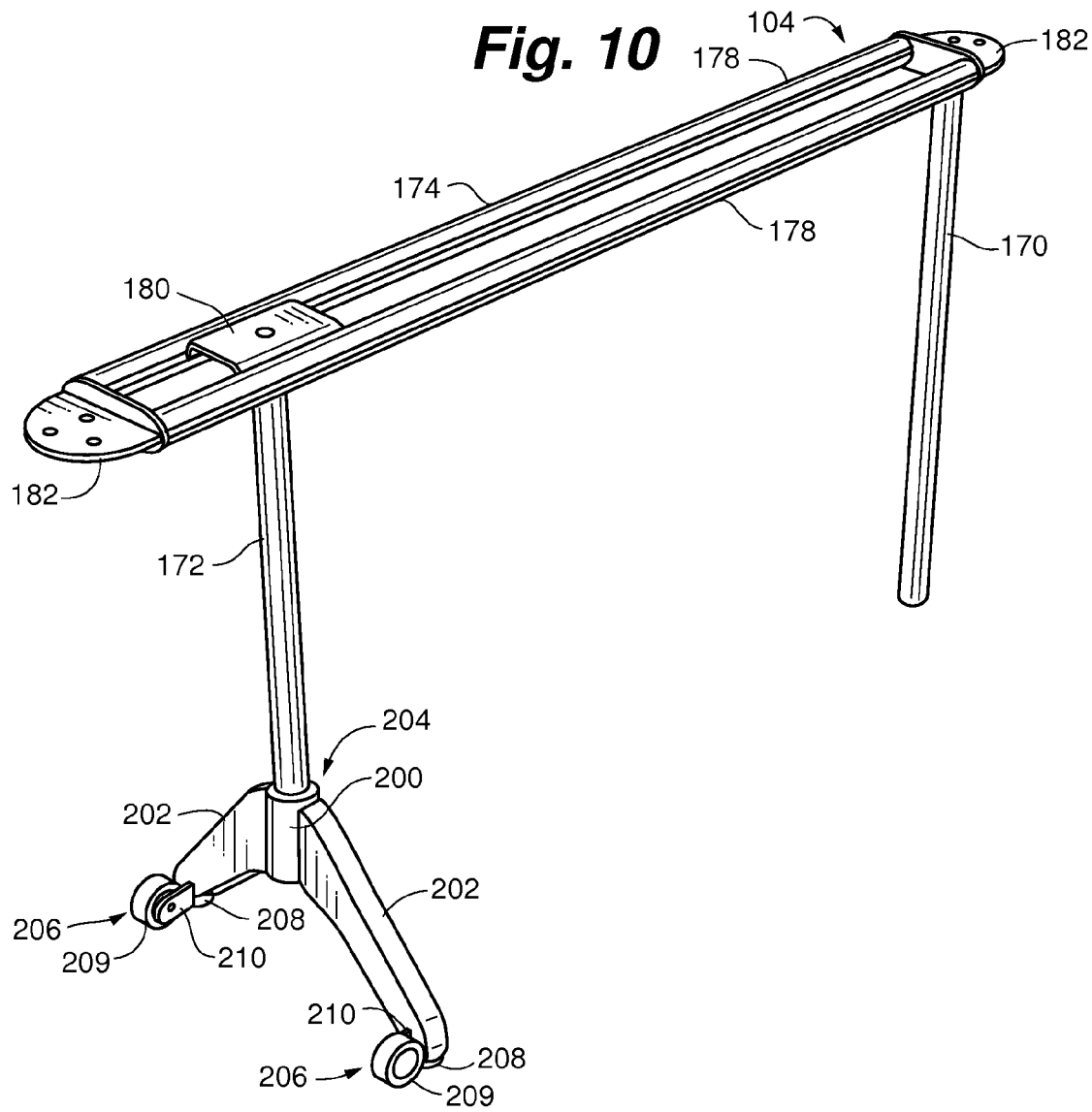
FIG. 10 is a front perspective view of a rack of a conductor system according to an embodiment.

With podium 102 in a desired position, the height and relative position of shelf 110 can be adjusted by a user. Shelf 110 can be raised and lowered by actuation of telescoping mechanism 138. In an embodiment, outer mast 134 provides a housing for inner mast 136 such that inner mast 136 is slidable within outer mast 134. Telescoping mechanism 138 is operably connected to inner mast 136. Referring to FIG. 9, connecting rod 147 is coupled to trigger 144 and latch plate 146. As depicted in FIG. 9, connecting rod 147 and latch plate 146 are housed substantially within inner mast 136. When trigger 144 is actuated (such as, for example, by lifting) by a user, connecting rod 147 is lifted, which in turn causes latch plate 146 to rotate. The rotational movement of latch plate 146 thereby causes engagement member 152 to disengage from slot 142 outer mast 134. In this manner, inner mast 136 is freely slidable within outer mast 134 such as, for example, to raise or lower shelf 110. Inner mast 136 can be locked into place with respect to outer mast 134 by release trigger 144 and allowing engagement member 152 or latch plate 146 to reengage a different slot 142 in outer mast 134. In an embodiment, telescoping mechanism 138 may include a biasing member to facilitate the engagement of engagement member 152 with a slot 142 in outer mast 134, as depicted in FIG. 6. Slots 142 may be positioned incrementally or non-incrementally in outer mast 134. In an embodiment, slots 142 are positioned incrementally at 6-inch intervals. The distance between slots 142, however, can be any number of distances without affecting the spirit or scope of the present invention.

Shelf 110 can also be positioned according the preferences of a user. In an embodiment, shelf 110 can be rotated and tilted. To tilt shelf 110, a user can apply a force proximal one of the edges of primary surface 156 of shelf 110. In this manner, column bracket 164 can rotate with respect to shelf bracket 140. Positioning mechanism 160 may include any number of mechanisms known in the art for self-securing of shelf 110 of a podium 102.

To rotate shelf 110, swivel knob 168 can be actuated to partially release first and second swivel plates 166, 167. In an embodiment, first swivel plate 166 is coupled to the underside of shelf 110 and second swivel plate 167 is coupled to positioning mechanism 160. In this manner, when swivel knob 168 is actuated, shelf 110 can swivel with respect to column 108 and base 106. When shelf 110 is in a desired position, user can manipulate swivel knob 168 so that first and second swivel plates 166, 167 are secured with respect to each other. Shelf 110 can thereby be substantially secured.

Rack 104 can by positioned into a desired location by a user in a manner similar to the positioning of podium 102. To position rack 104, rack 104 can be tilted about wheels 208 of wheel assembly 206 into a transport position. For example, a user can lift up on leg 170 such that wheels 208 of wheel assembly 206 coupled to base 176 engage the ground. Rack 104 can then be rolled into a desired position and tilted back into a performance position such that wheels 208 are disengaged from the ground. In an embodiment, the bottoms of wheels 208 are approximately 1/16 inch above the ground in the performance position. In this manner, rack 104 can be repositioned by a user without having to be lifted off the ground. A second rack 104 can be positioned in a similar manner.

Cross members 178 can be joined by coupling members 182 at first and second ends 184, 186 of cross members 178. In an embodiment, first and second ends 184, 186 define apertures (not shown) adapted to receive fastening members 195. Cross members 178 can be coupled to coupling members 182 by aligning apertures 216 in mating structure 212 of coupling members 182 in registry with the apertures (not shown) in first and second ends 184, 186 of cross members 178 and inserting fastening members 195 therein.

Legs 170, 172 can be coupled to platform 174. Leg 170 is generally coupled to coupling member 182, as depicted in FIG. 13. The top end of leg 170 has cap 173, which may be attached by, for example, welding. Cap 173 may define threaded aperture adapted to receive fastening member 197. The threaded aperture of cap 173 is aligned in registry with apertures 216 (which may also be threaded) in flange 210 of coupling member 182 and fastening member 197 is inserted therein. In this manner, leg 170 can be fixedly coupled to platform 174. Leg 172 is generally coupled to attachment bracket 180 such that leg 172 is infinitely adjustable between first and second ends 184, 186 of cross members 178. In an embodiment, leg 172 is welded to attachment bracket 180.

In an embodiment, rack 104 is rolled to a position such that leg 170 is proximal base 106 of podium 102. Rack 104 can then be coupled to podium 102 by inserting leg 124 into base 106 of podium 102. Channel 126 defined by leg retainer 124 and leg 170 are adapted to conformingly fit. Leg 172 may also be adapted to conformingly fit into channel 126. In this manner, channel 126 can receive and retain leg 170 or 172 of rack 104. A second rack 104 can be coupled to base 106 or podium 102 in a similar manner.

The height of platform 174 relative to the ground can also be adjusted. The respective heights of legs 170, 172 are generally adjusted in the same or a substantially similar manner. In an embodiment, legs 170, 172 of rack 104 have an inner leg positioned within outer leg 169 such that inner leg can slide within outer leg 169. In this manner, the inner leg can be raised and lowered with respect to outer leg 169. Since inner leg is generally coupled to coupling member 182 by way of cap 173 and outer leg 169 is stationary with respect to floor, raising and lowering the inner leg with respect to outer leg 169 causes platform 174 to be raised and lowered with respect to the floor. The position of the inner leg with the respect to outer leg 169 can be secured in any number of ways. In an embodiment, apertures in the inner leg are aligned in registry with apertures 175 of outer leg 169. Pin 175 of retainer 171 can then be inserted through an aperture of the inner leg and aperture 175 of outer leg 169, as in a pin-in-whole locking assembly. Clip 177 may be adapted to conformingly receive and retainer outer leg 169. Handle 179 may be adapted to facilitate manipulation of clip 171 by a user. In an alternative embodiment, the inner leg is secured with respect to outer leg 169 by releasable compression fit.

In an embodiment, with rack 104 coupled to podium 102, a user can manipulate attachment bracket 180 to position and reposition leg 172. Referring to FIGS. 10-16, cross members 178 receive fastening members 194 through fastening member opening 190. Fastening members 194 may, for example, be a threaded carriage bolt. Slide channel 188 is adapted such that fastening members 194 can be slid through slide channel 188. Opposing lips 188 can retain fastening members 194 within slide channel 188. The portions of fastening members 194 not retained within slide channel 188 can be attached to body 192 and secured, for example, with a wing nut. Generally, a plurality of fastening members 194 are attached to body 192. Slide channel 188 is adapted to slidably receive fastening members 194 such that fastening members 194 can slide between first and second ends 184, 186 of cross member 178. With fastening members 194 attached to body 192, body 192 is thereby infinitely adjustable between first and second ends 184, 186 of cross members 178.

In an embodiment, each cross member 178 includes a pair of slide channels 188. As depicted in FIGS. 13-14, slide channels 188 are positioned on substantially opposite sides of the main body of slide channel 188. A feature and advantage of this arrangement is that cross members 178 are interchangeable. Another feature and advantage of this arrangement is that the slide channel 188 that is not used to carry fastening member 194 can be used to facilitate cable management. For example, power cords, audio/video cables, and other types of electronics accessories can be positioned with slide channel 188 to hide from view and avoid entanglement. Yet another feature and advantage of this arrangement is that a first slide channel 188 of cross member can be used for attachment bracket 180 while a second slide channel 188 can be used for mounting accessory device 103.

A feature and advantage of various embodiments is the ability of a user to couple accessories to rack 104 such that the accessories are infinitely adjustable between first and second ends 184, 186 of cross members 178. In an embodiment, the user's accessories can be coupled directly to body 192. In alternative embodiments, the user's accessories can be coupled to accessory attachment device 103, which is in turn coupled to cross members 178. Referring to FIGS. 17-20, coupling mechanism 224 can be attached to cross members 178 of rack 104. In an embodiment, outer guide 235a can engage an outer slide channel 188 of a first cross member 178. Outer guide 235b and inner guide 237 fit substantially around a second cross member 178. Locking knob 239 can be manipulated so as to engage the outer slide channel 188 of the second cross member 178, thereby substantially securing accessory attachment device 103 in place. In accordance with user preferences, locking knob 239 can be manipulated to release and resecure accessory mounting device 103 between first and second ends 184, 186 of cross members 178. Accessory mounting device 103 is thereby infinitely adjustable between first and second ends 184, 186 of cross members 178. In this manner, accessories having any number of sizes and dimensions can be positioned on platform 174.

The relative height of accessory attachment device 103 can also be adjusted in according with the preferences of a user. Outer tube 230 generally slidably receives inner tube 228. Outer tube 230 is attached to plate 233, such as, for example, by welding. Inner tube 228 is attached to shelf 218, such as, for example, by way of tilting mechanism 220. In this manner, the height of shelf 218 can be adjusted relative to plate 233. In an embodiment, locking knob 231 of height adjustment mechanism 222 can be manipulated to release inner tube 228. With inner tube 228 released, inner tube 228 is thereby substantially free to slide within outer tube 230. When shelf 218 has achieved a height in accordance with the preferences of a user, locking knob 239 can be manipulated to substantially secure the position of inner tube 228 with respect to outer tube 230.

Tilt adjust mechanism 220 can also be manipulated to adjust the pitch of shelf 218. Tilt adjust mechanism 220 may include any number of mechanisms known in the art for self-securing of shelf 218 of accessory attachment device 103. In an embodiment, secondary surface 226 is positioned in relation to primary surface 228 at a substantially 90-degree angle. Shelf 218 can thereby support a user's accessories (such as, for example, a conductor's wand, sheet music, writing implements, etc.) when shelf is positioned other than into a horizontal position.

A further feature and advantage of embodiments is increased stability while providing for maneuverability. In particular, podium 102 and racks 104 can be reversibly coupled and moved into positioned without a complex array of parts and without requiring either component to be lifted off the ground. In addition, when coupled, podium 102 and rack 104 can be respectively positioned into various configurations that resist inadvertent tipping.

Figure 21:
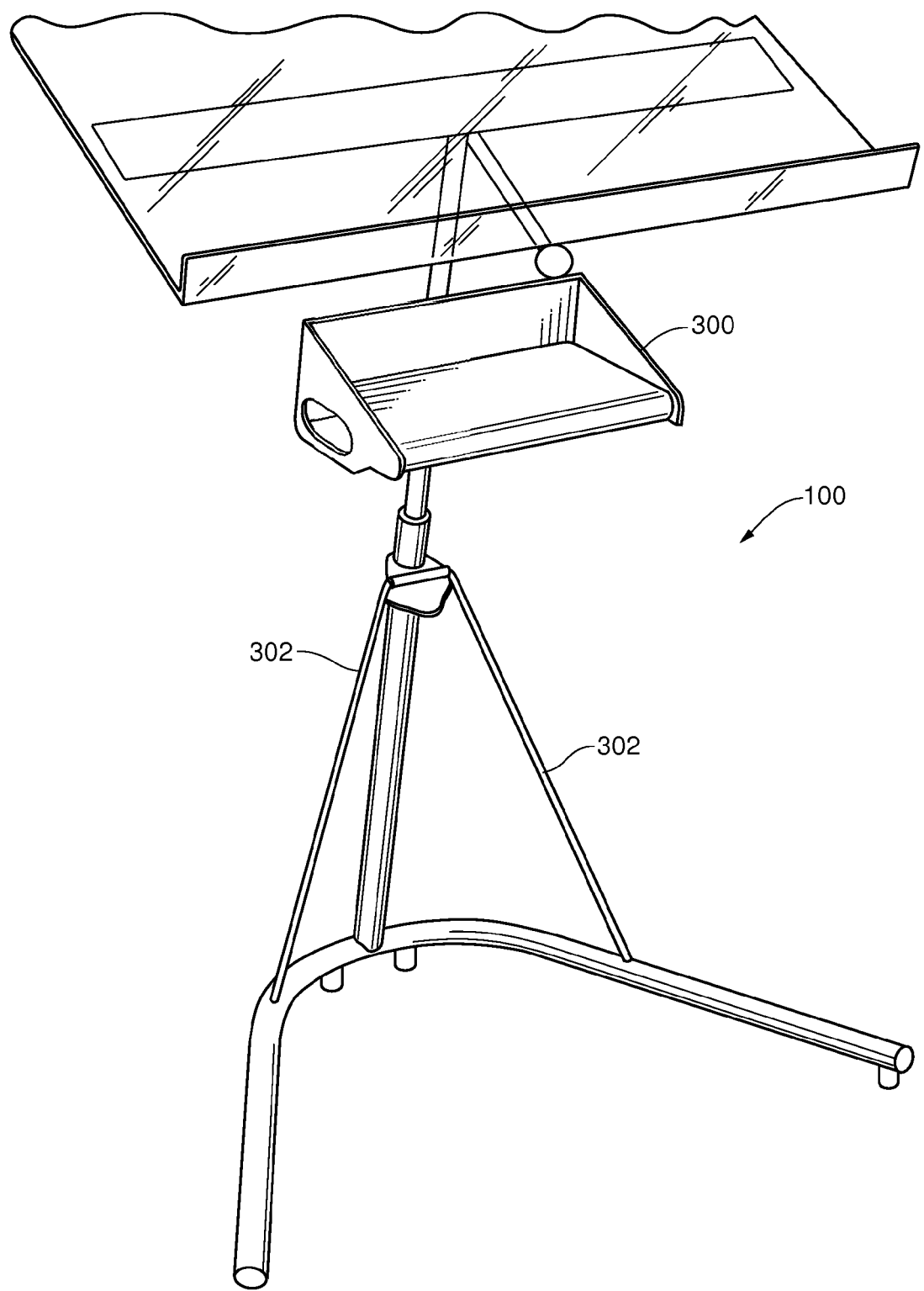
FIG. 21 is a perspective view of a conductor system according to an embodiment.
Figure 22:
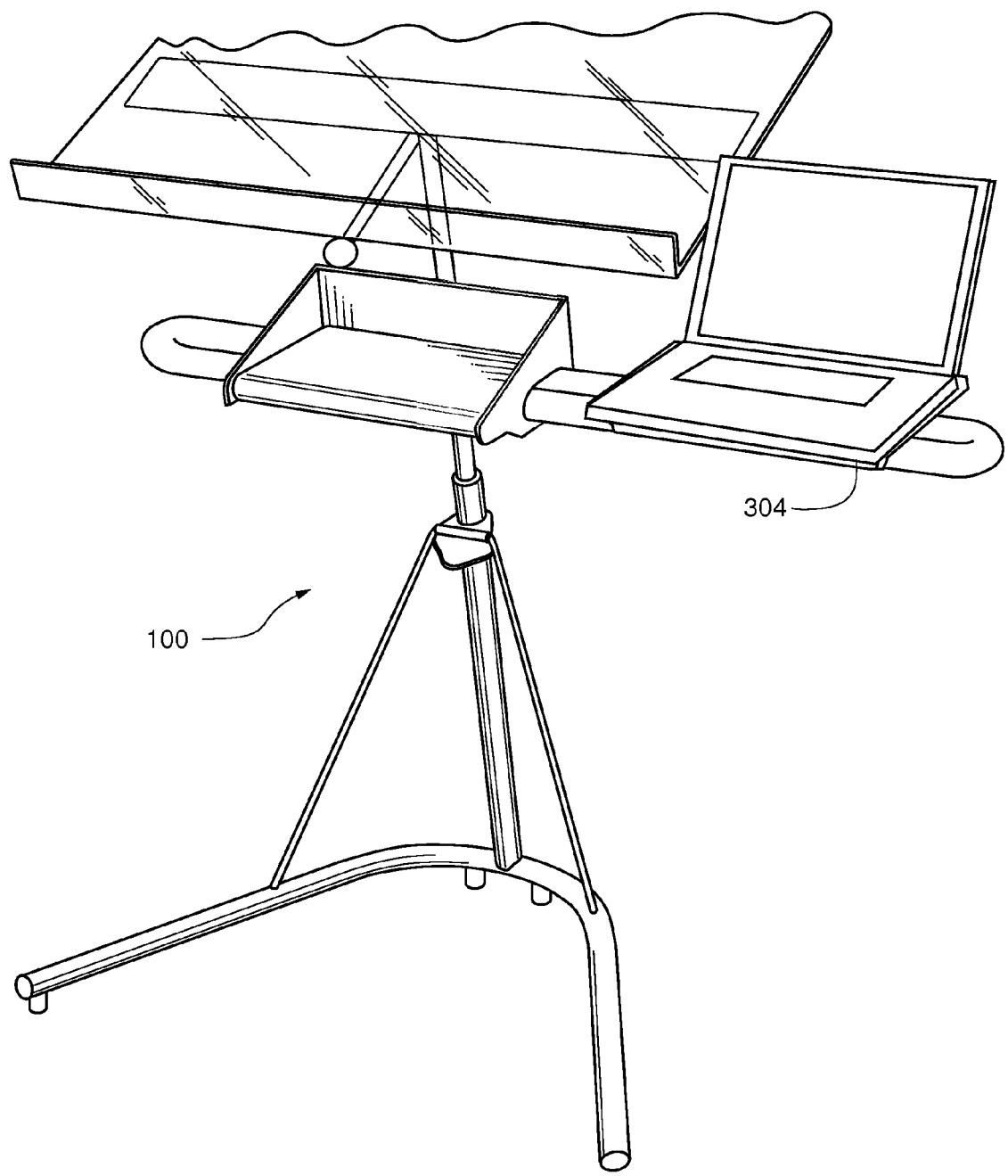
FIG. 22 is a perspective view of a conductor system according to an embodiment.
Figure 23:
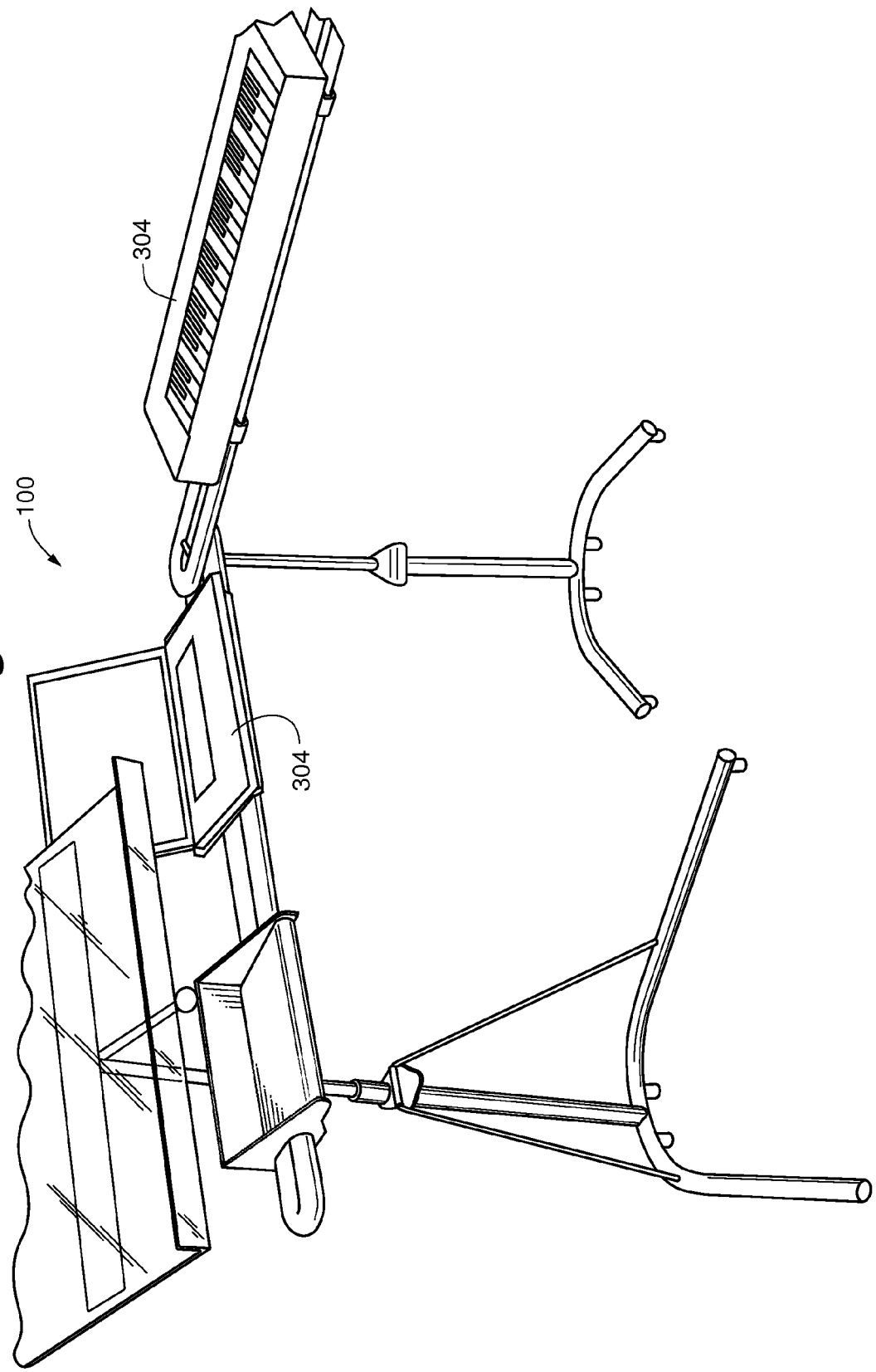
FIG. 23 is a perspective view of a conductor system according to an embodiment.
Figure 24:
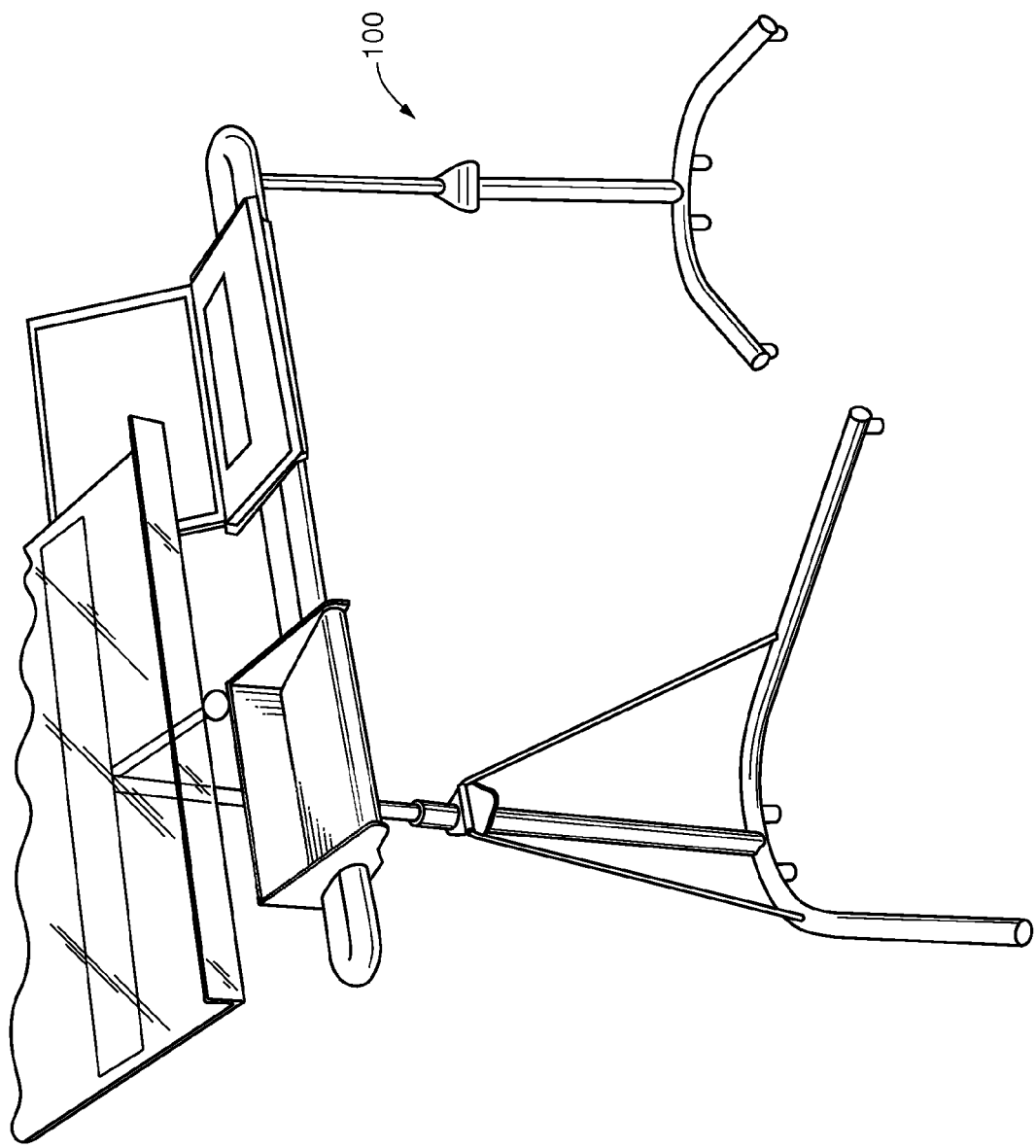
FIG. 24 is a perspective view of a conductor system according to an embodiment.
Figure 25:
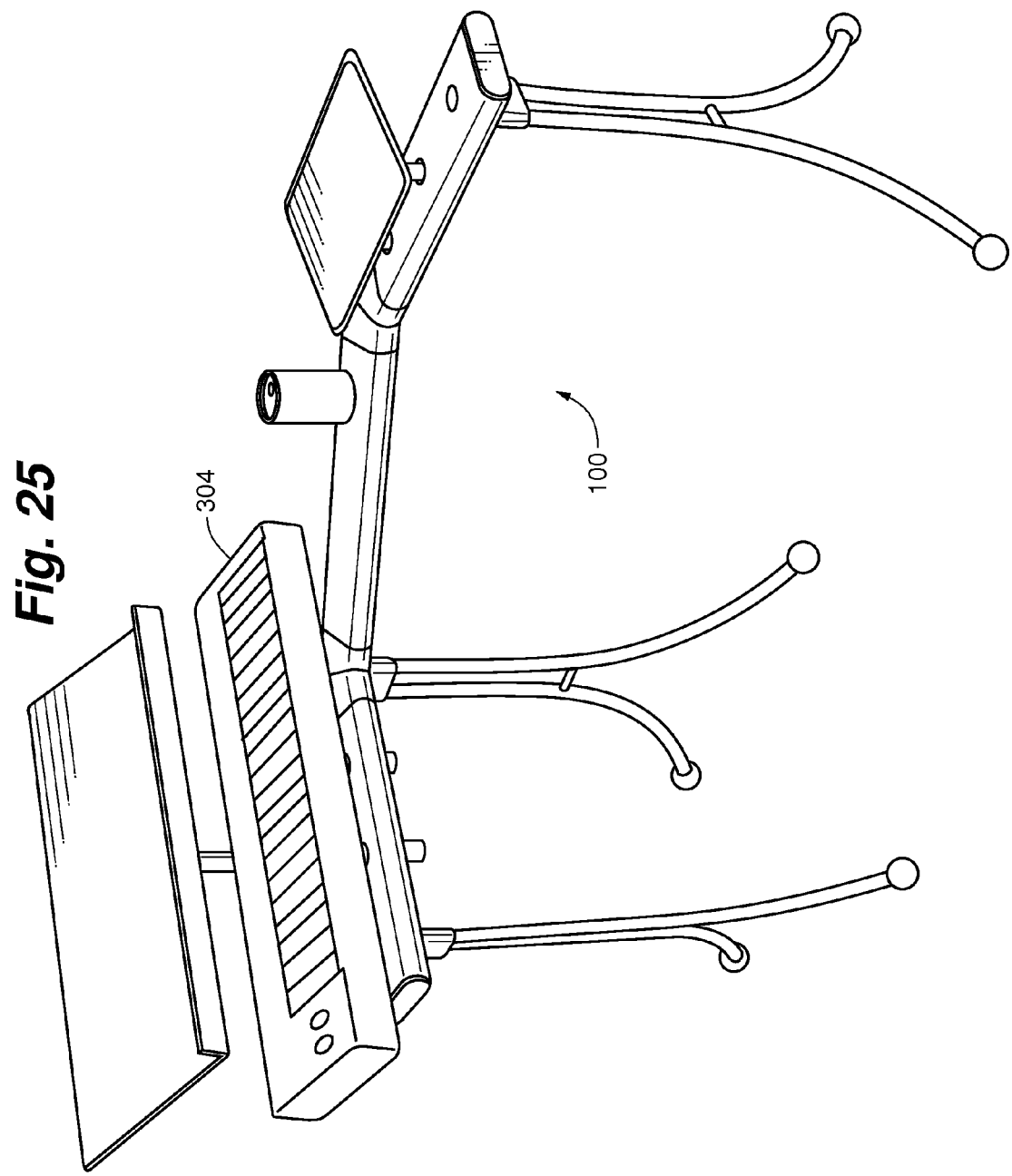
FIG. 25 is a perspective view of a conductor system according to an embodiment.
Figure 26:
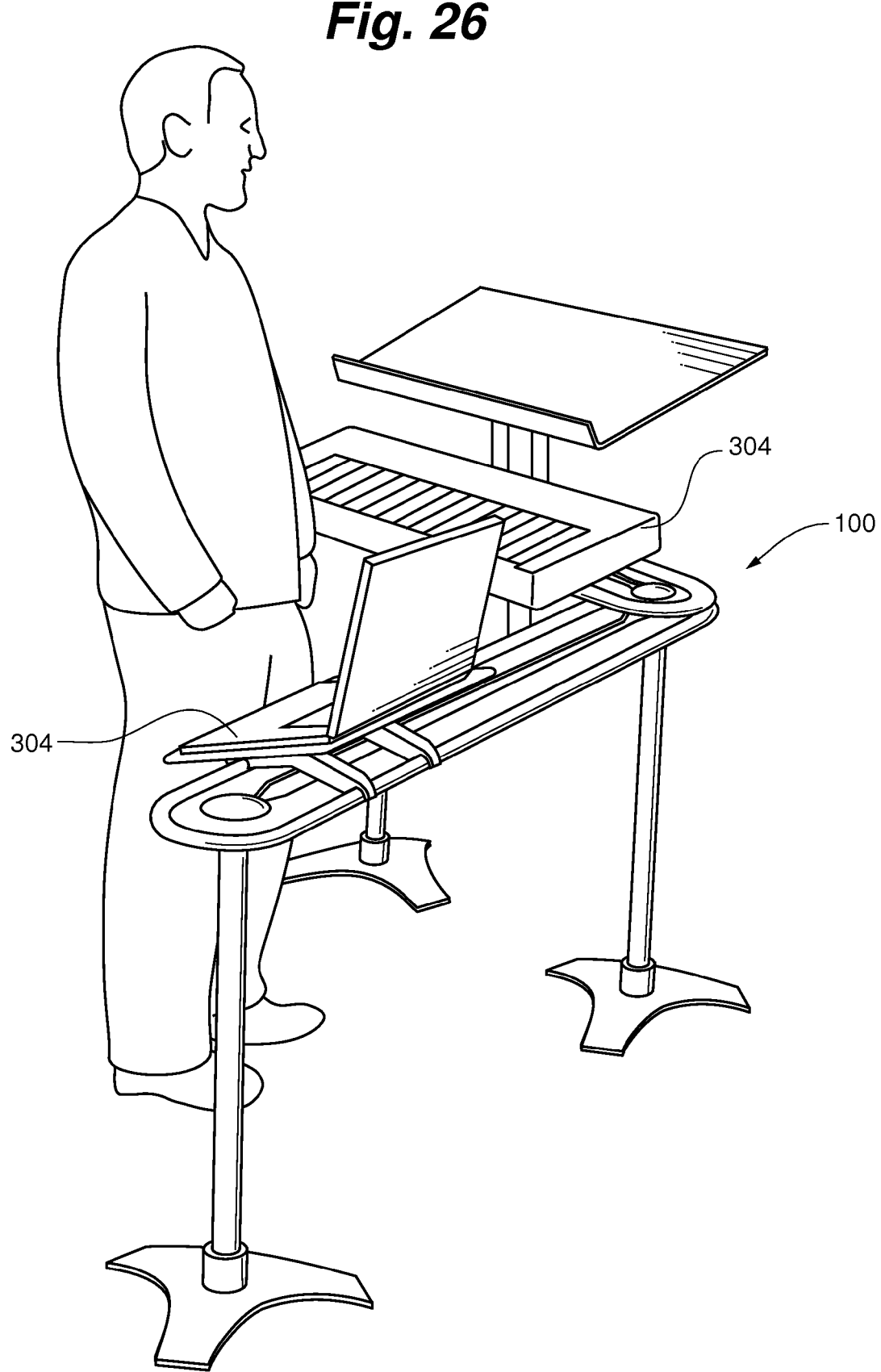
FIG. 26 is a side perspective view of conductor system according to an embodiment.
Figure 27:
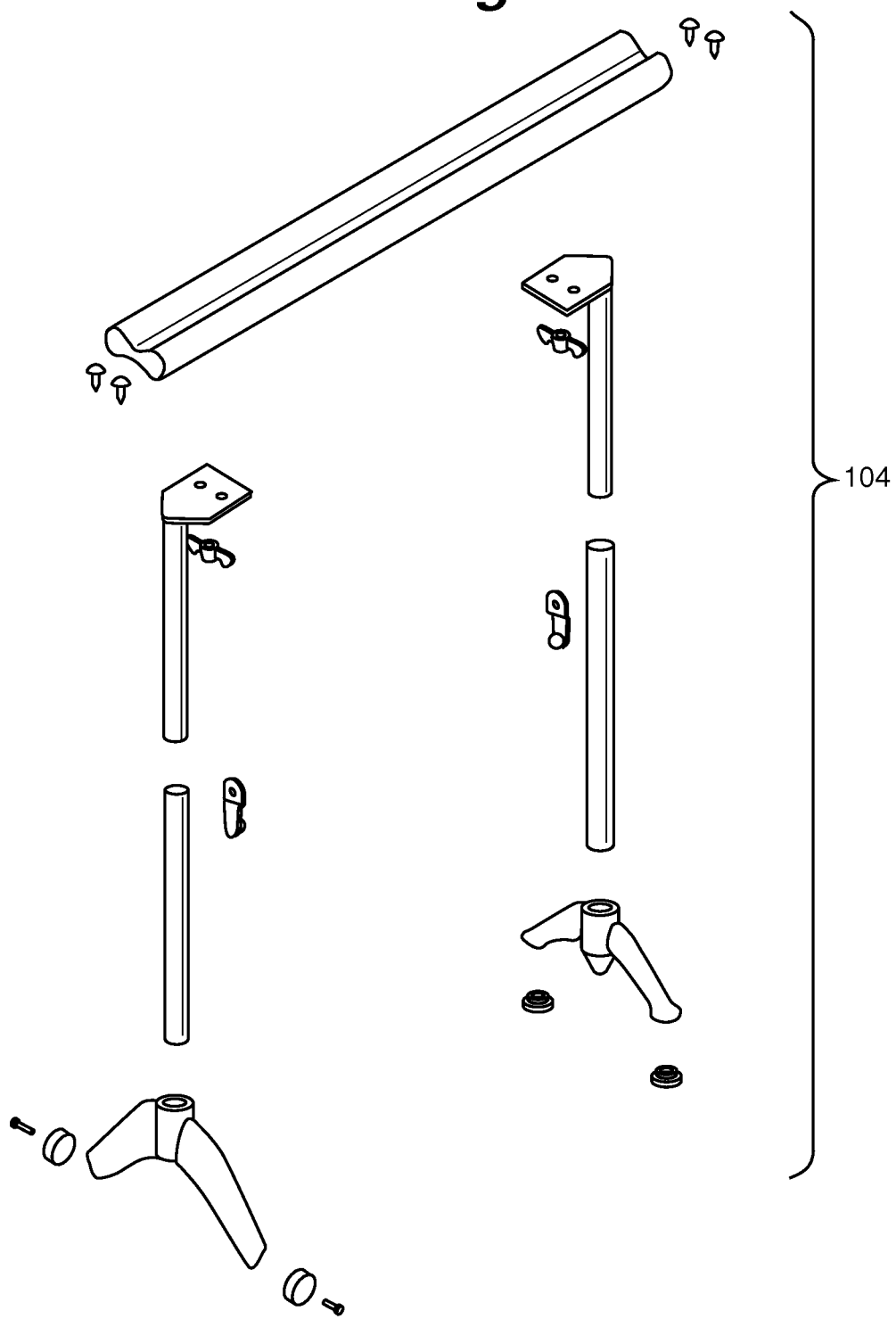
FIG. 27 is an exploded perspective view of a rack of a conductor system according to an embodiment.
Figure 30:
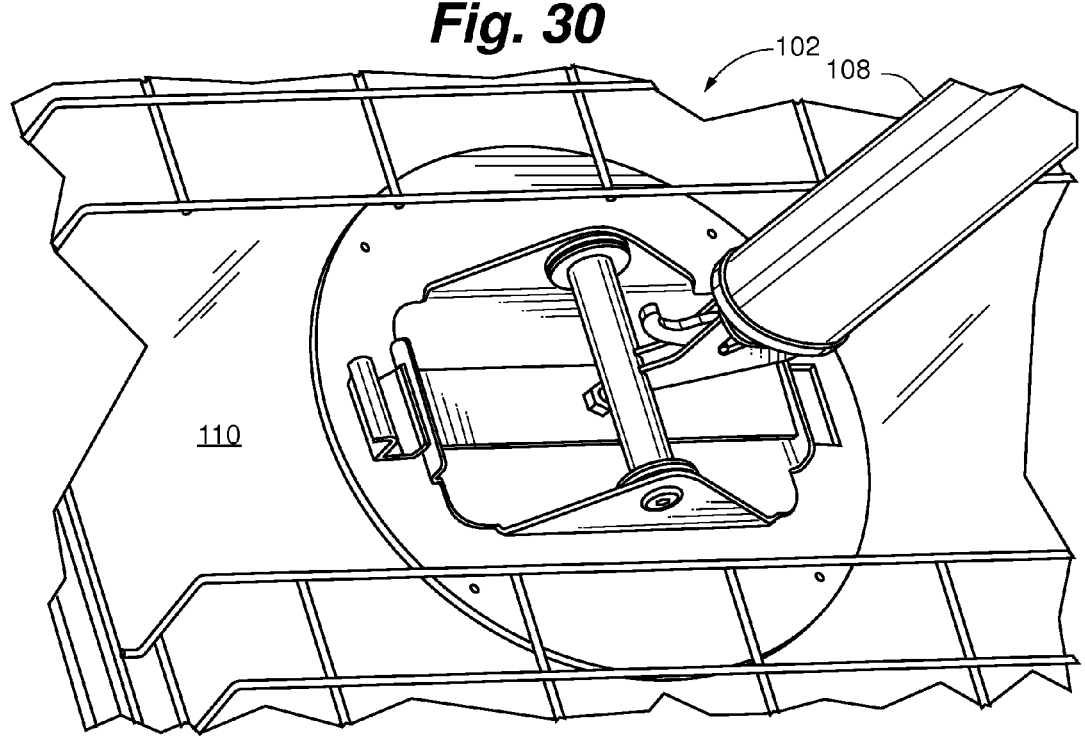
FIG. 30 is a partial bottom perspective view of a podium of a conductor system according to an embodiment.
Figure 31:
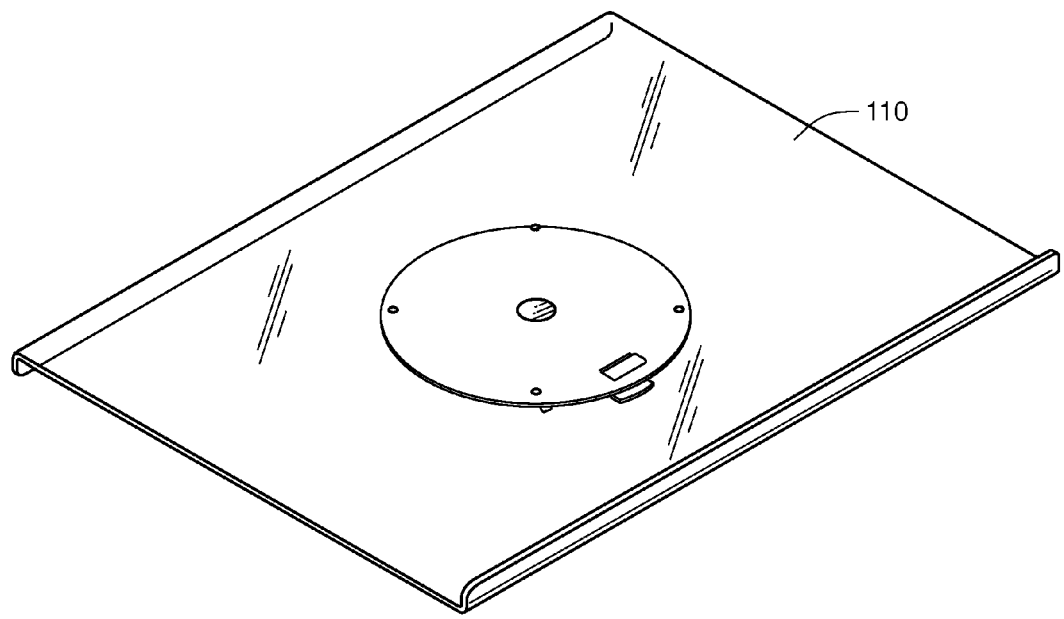
FIG. 31 is a top perspective view of a shelf of a podium of a conductor system according to an embodiment.
Figure 32:
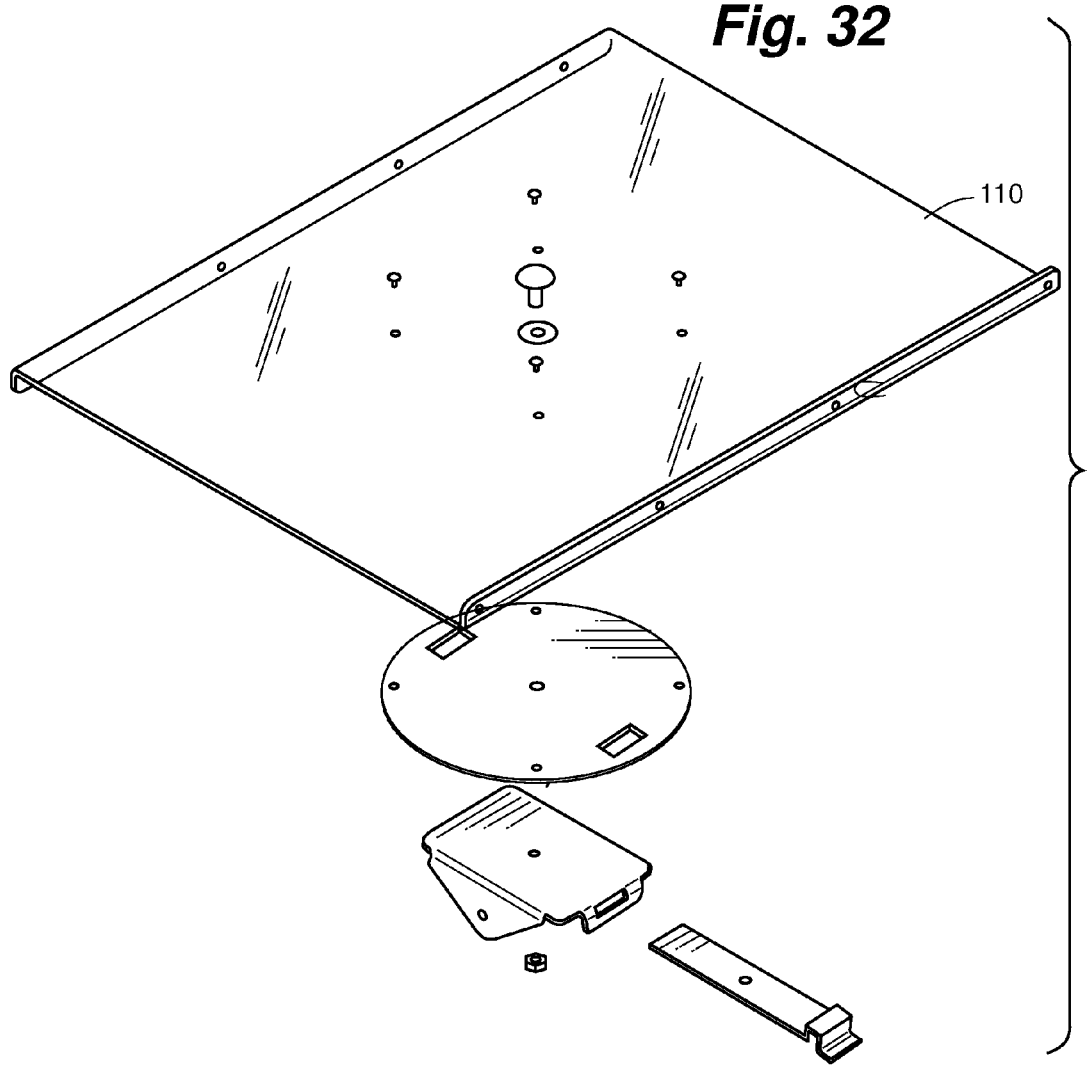
FIG. 32 is an exploded perspective view of a shelf of a podium of a conductor system according to an embodiment.
Figure 33:
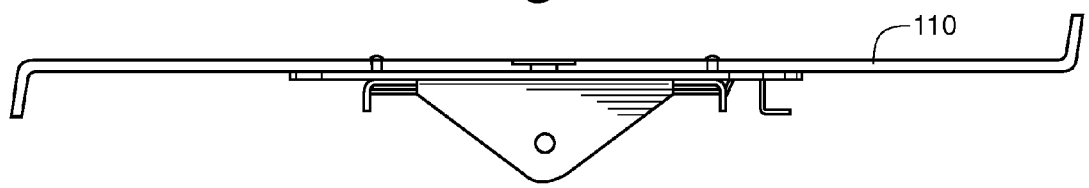
FIG. 33 is a side perspective view of a shelf of a podium of a conductor system according to an embodiment.
Figure 37:
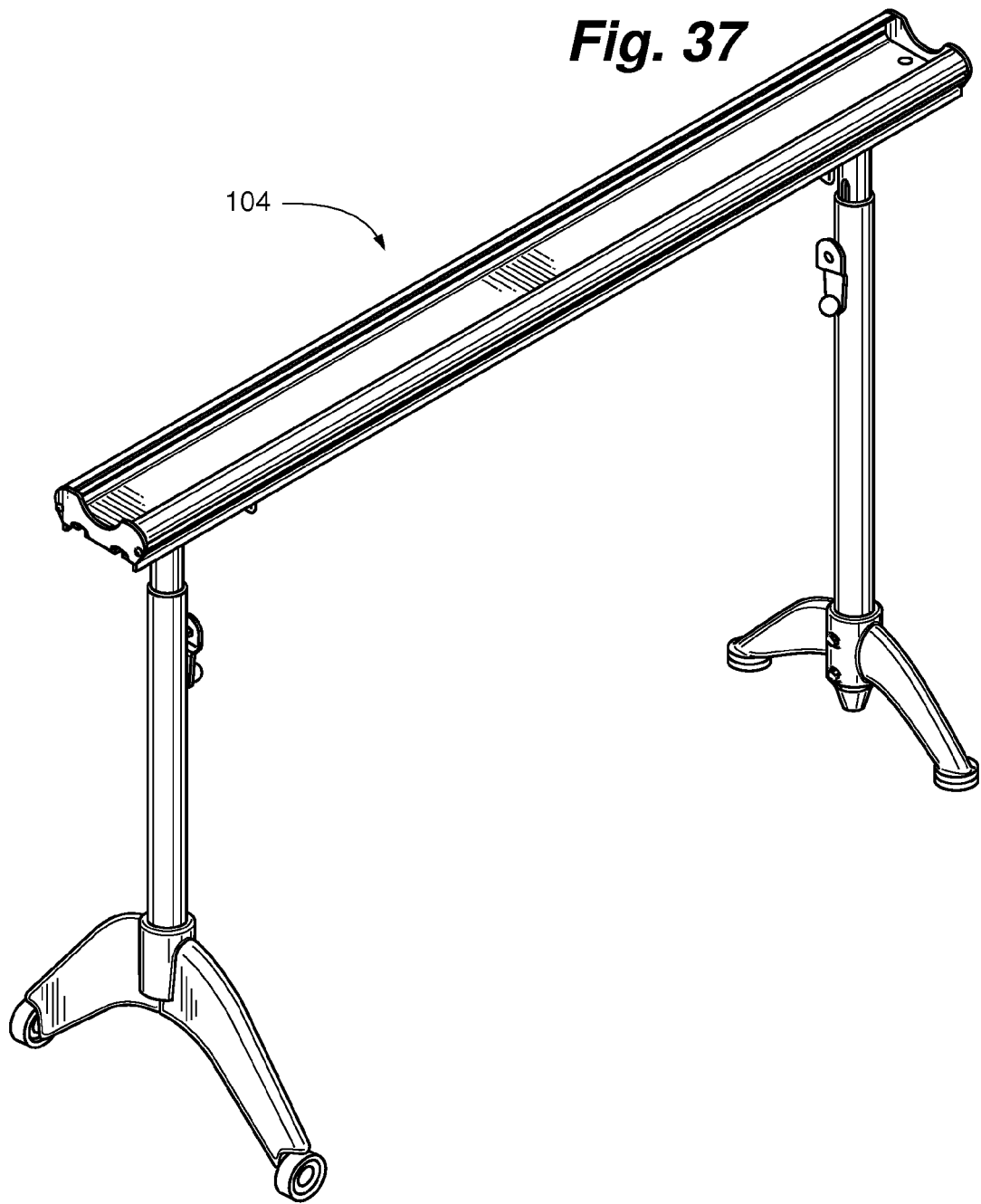
FIG. 37 is a top perspective view of a rack of a conductor system according to an embodiment.
Figure 38:
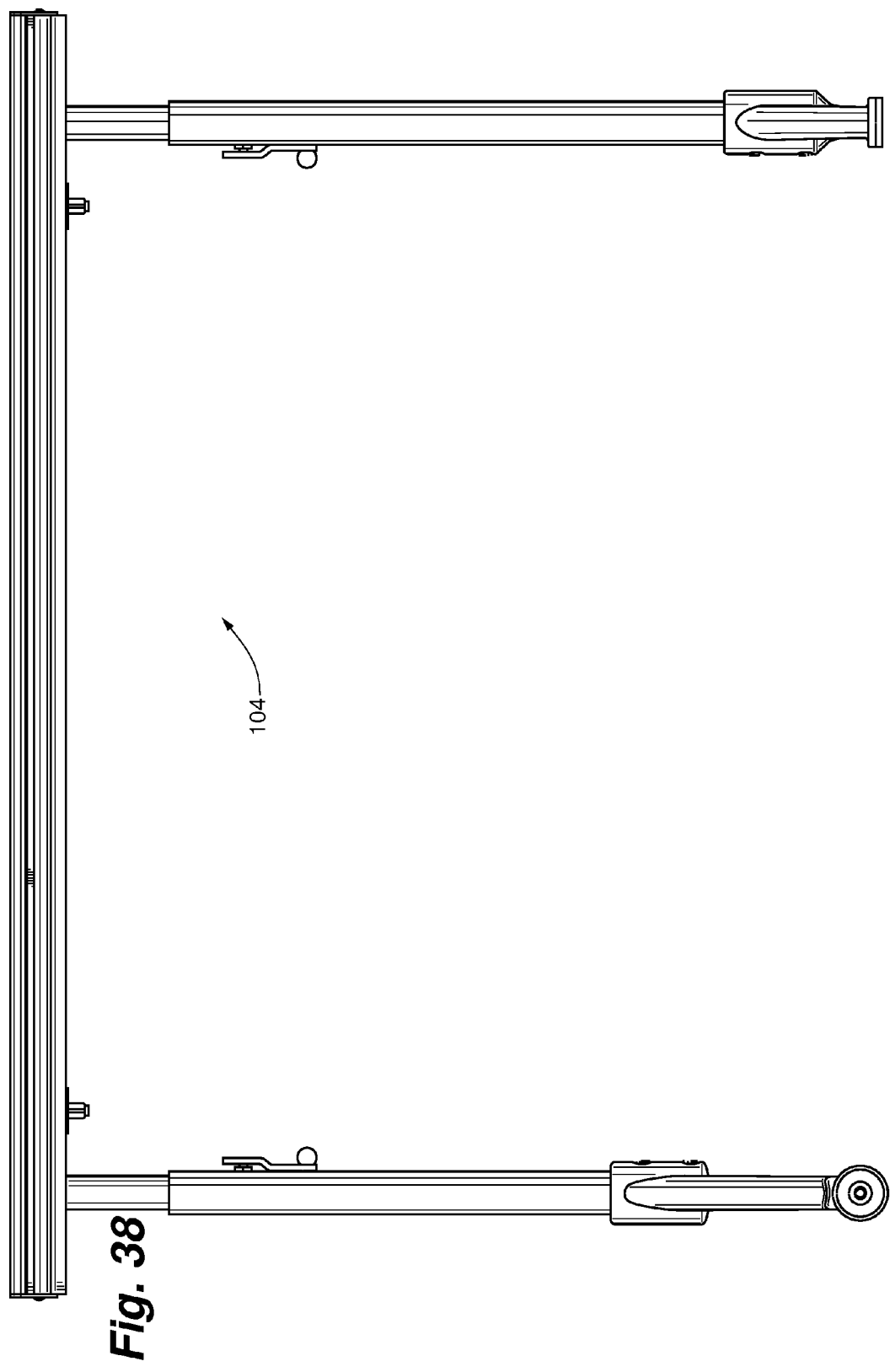
FIG. 38 is a front view of a rack of a conductor system according to an embodiment.
Figure 39:
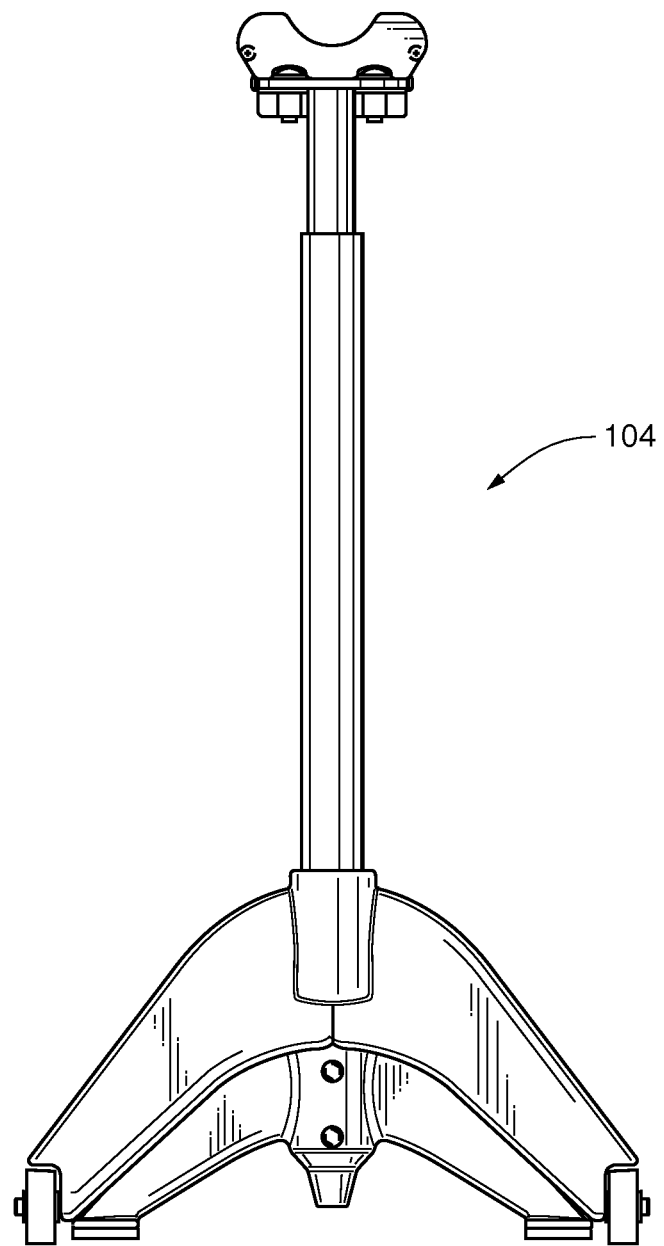
FIG. 39 is a front view of a rack of a conductor system according to an embodiment.
Figure 40:
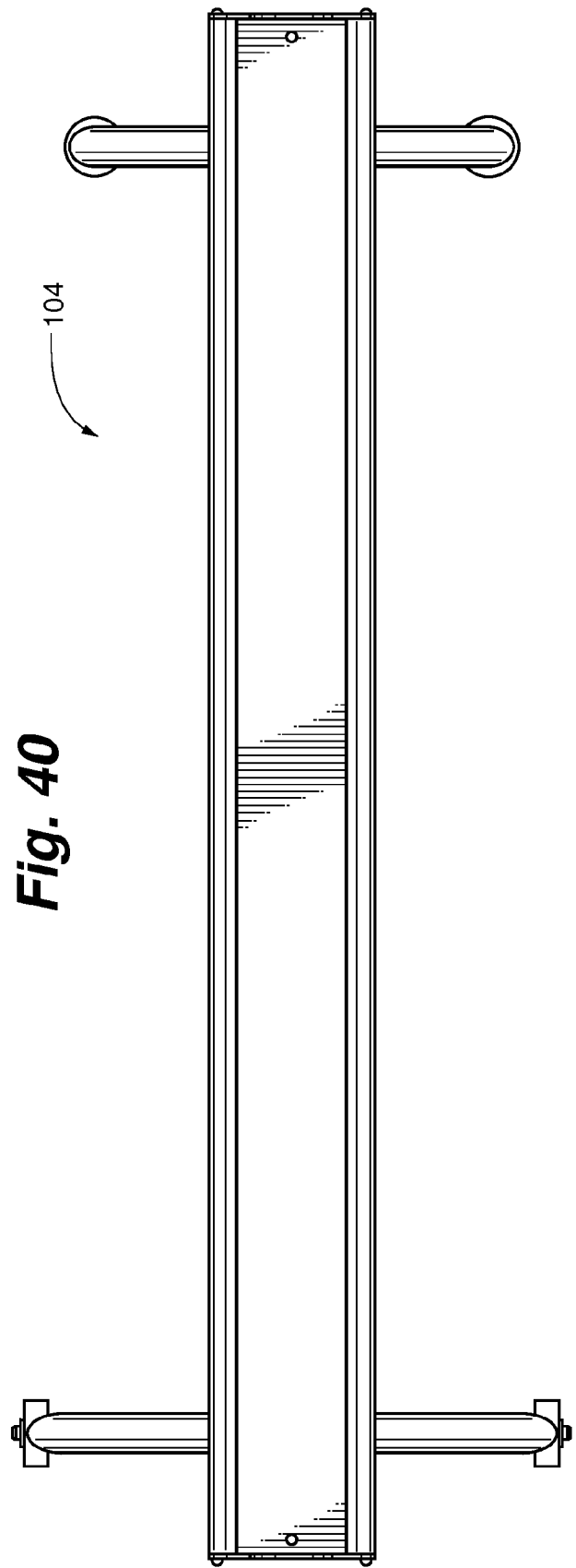
FIG. 40 is a top plan view of a rack of a conductor system according to an embodiment.
Figure 41:
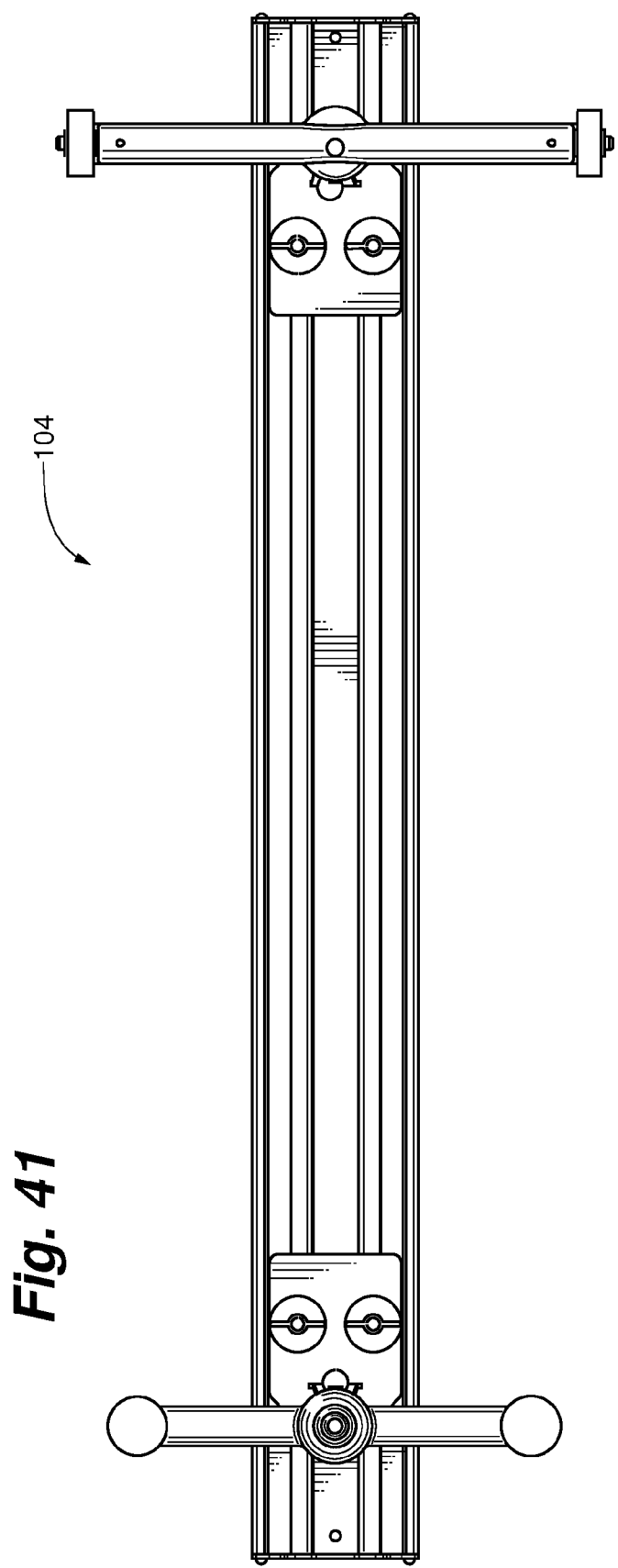
FIG. 41 is bottom plan view of a rack of a conductor system according to an embodiment.
Figure 42:
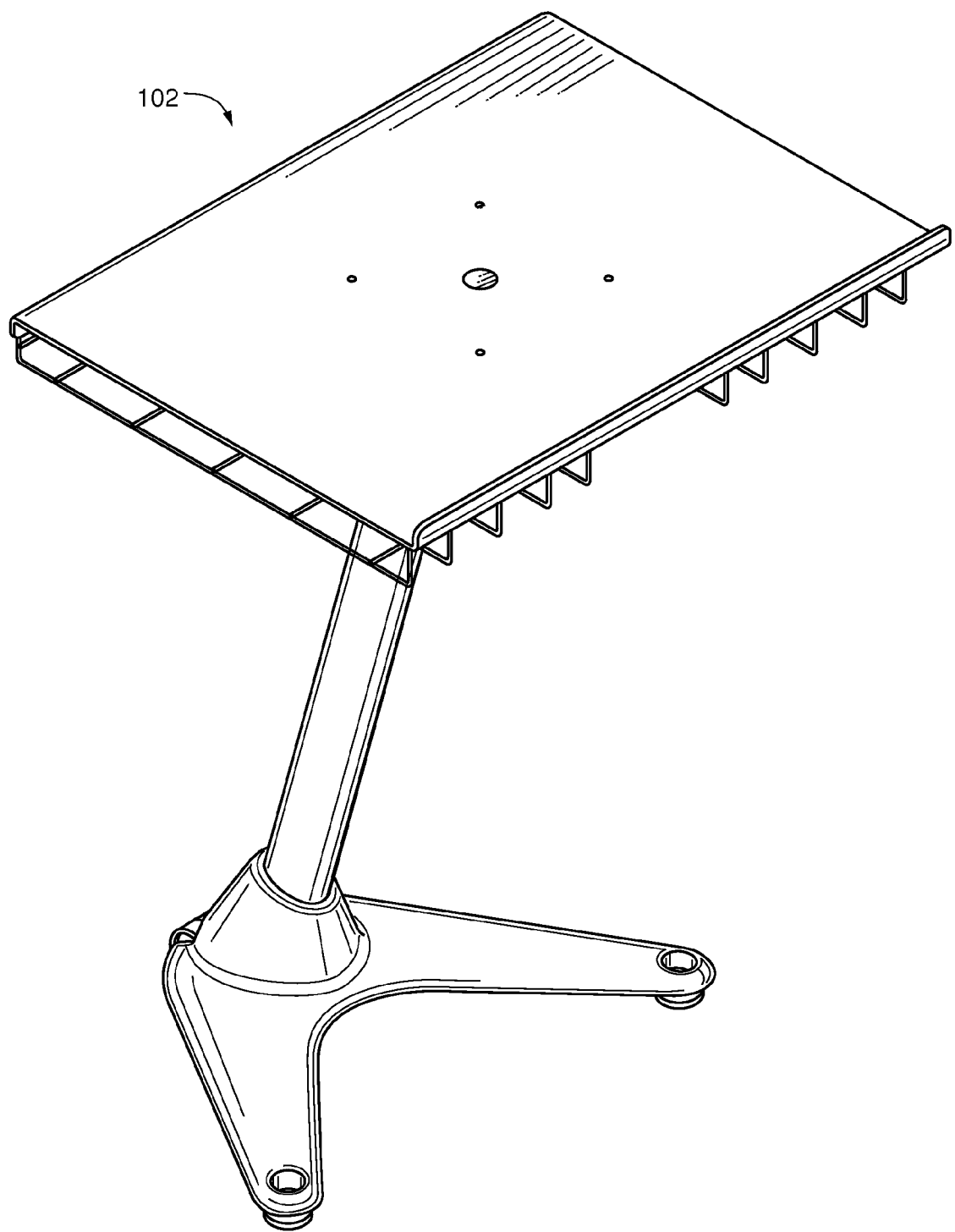
FIG. 42 is perspective view of a podium of a conductor system according to an embodiment.
Figure 43:
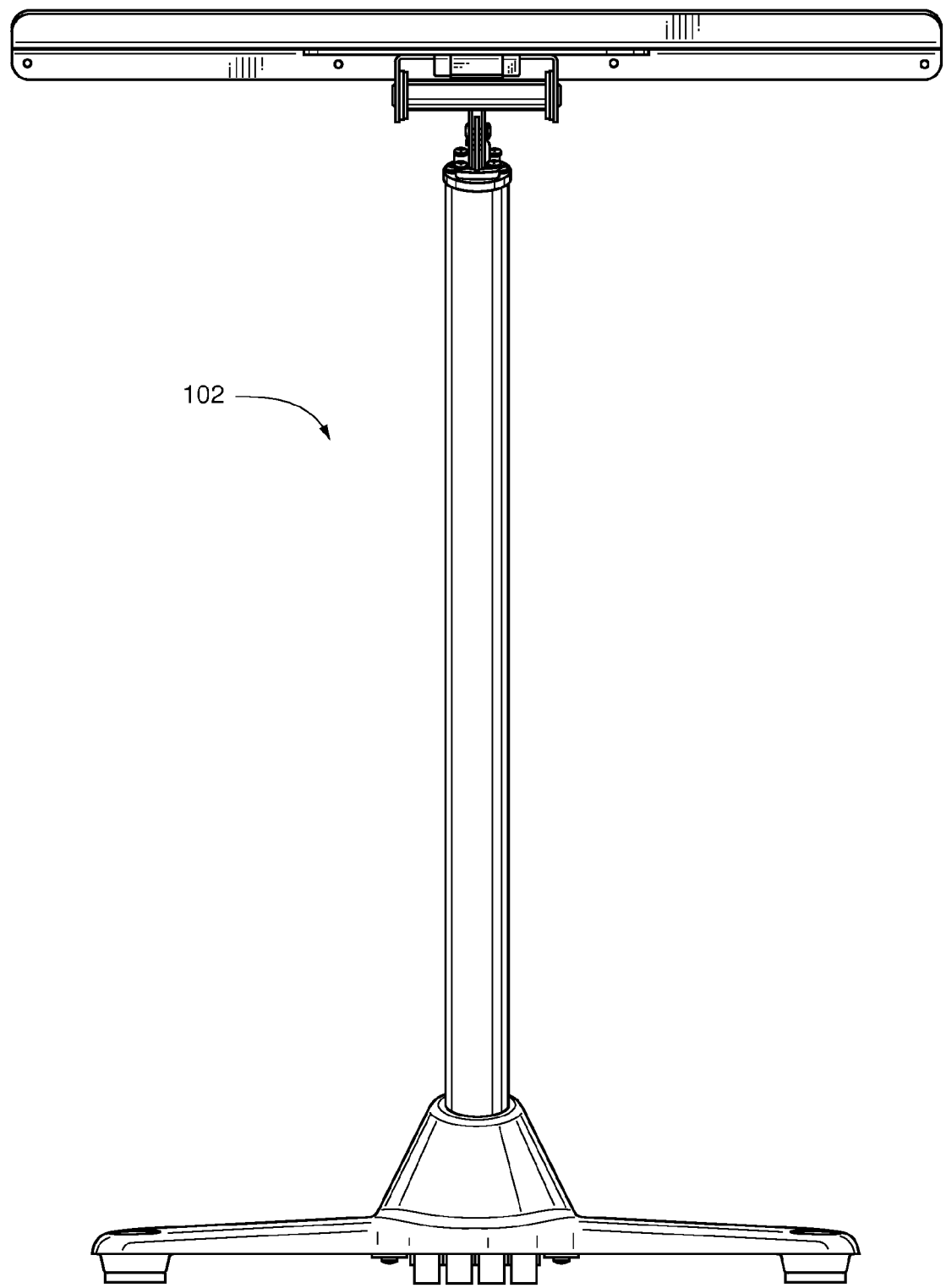
FIG. 43 is a front view of a podium of a conductor system according to an embodiment.
Figure 44:
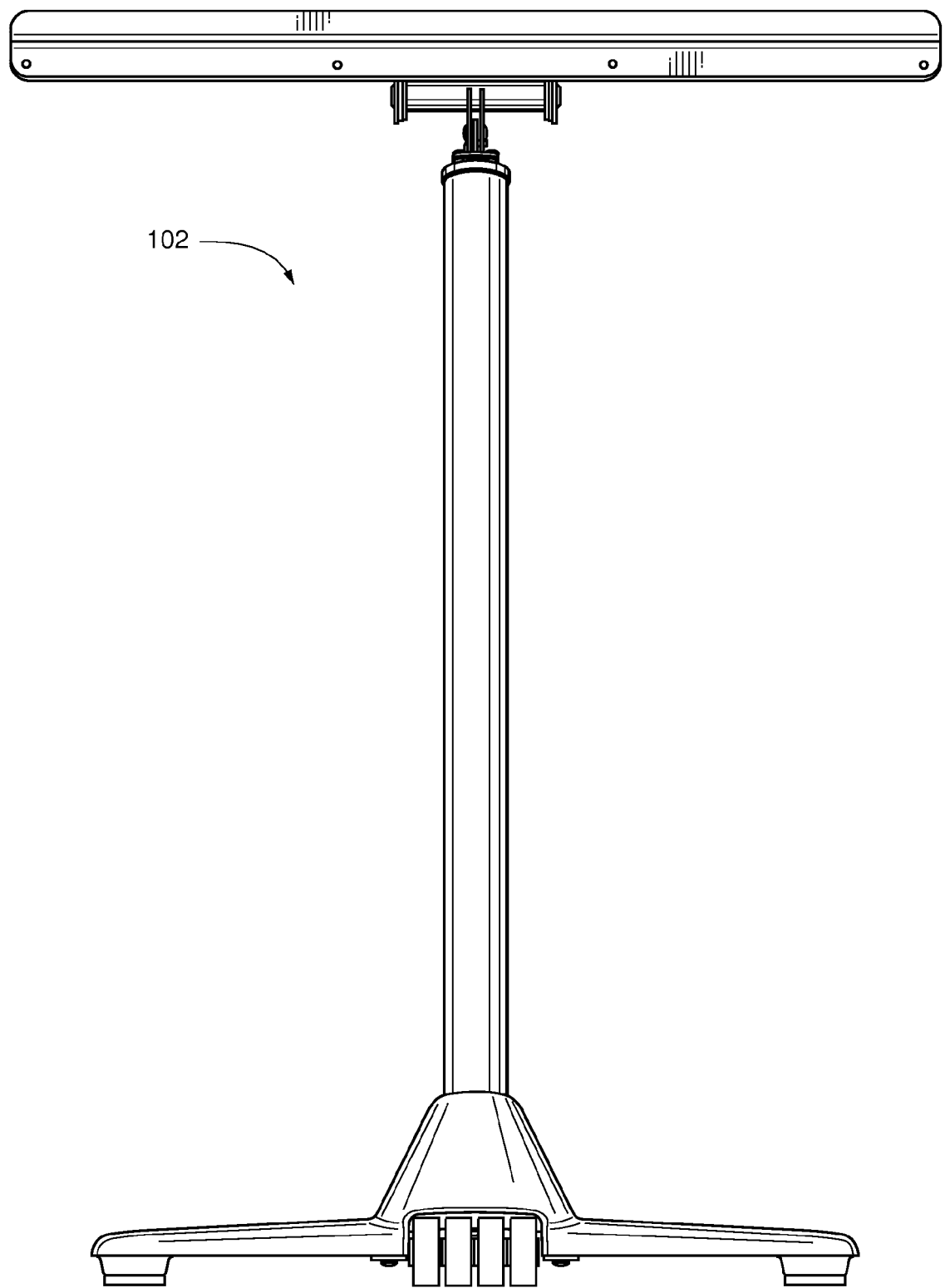
FIG. 44 is a rear view of a podium of a conductor system according to an embodiment.
Figure 45:
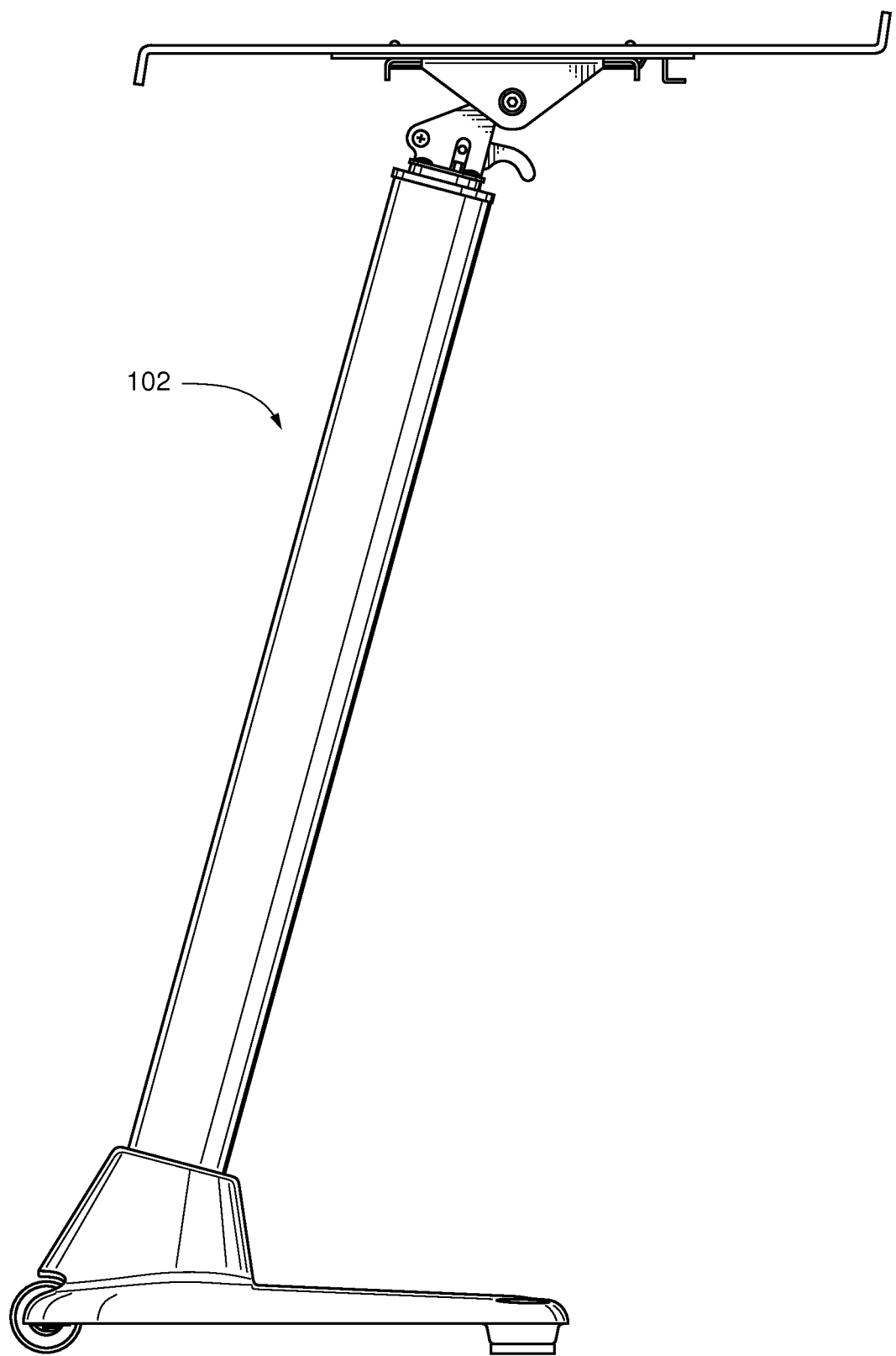
FIG. 45 is a side view of a podium of a conductor system according to an embodiment.
Figure 46:
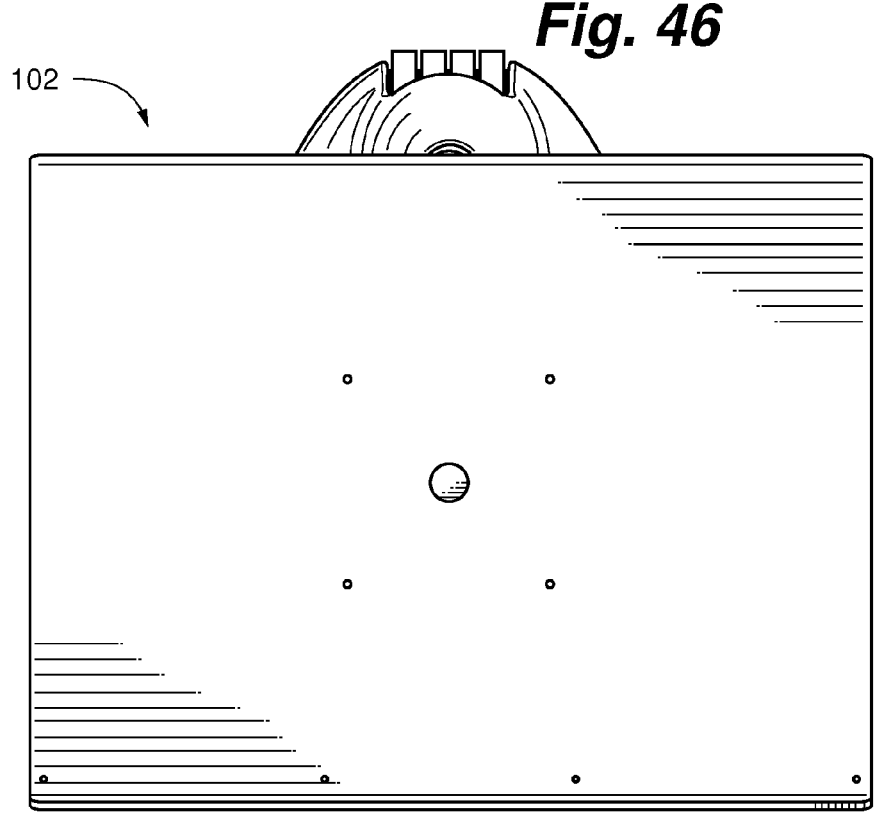
FIG. 46 is a top plan view of a podium of a conductor system according to an embodiment.
Figure 47:
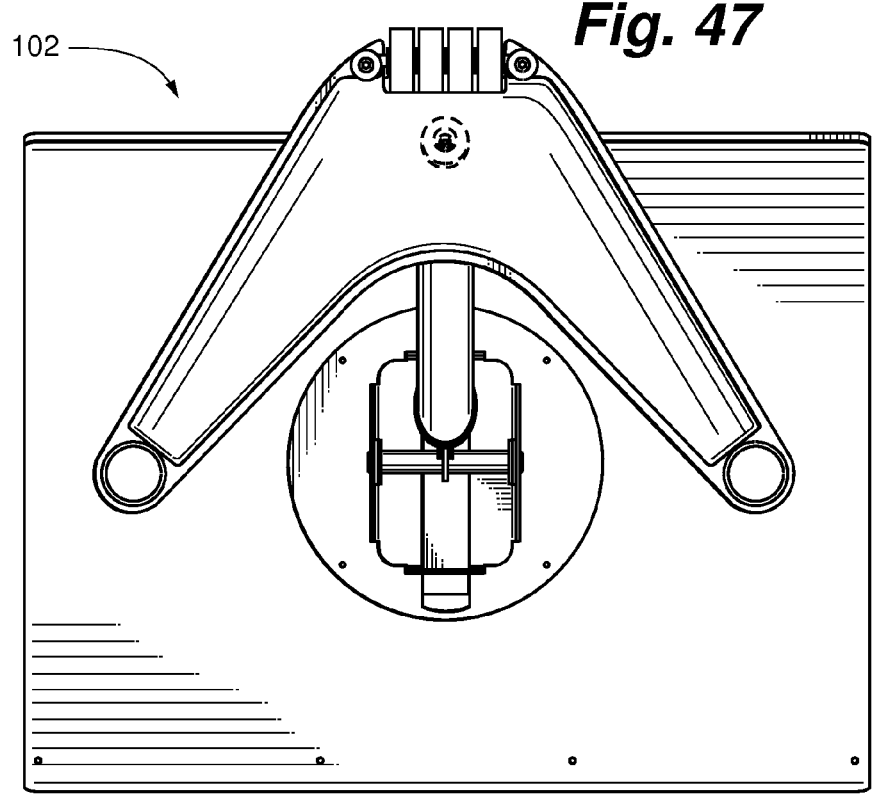
FIG. 47 is a bottom plan view of a podium of a conductor system according to an embodiment.

Additional embodiments of conductor system 100 are depicted in FIGS. 21-26. Referring to FIG. 21, conductor system 100 may include accessory carriage 300 and anti-torque rods 302. Accessory carriage may be coupled to column 108 of podium 102. Anti-torque rods 302 may be attached to base 106 and column 108 of podium 102 to provide added stability by resisting rotation of shelf 110 with respect to base 106. Referring to FIG. 17, platform 174 may be coupled to column 108 or podium 102. Referring to FIG. 18, a plurality of device podiums 174 may be coupled to column 108. As further depicted in FIG. 18, podium 102 may not include shelf 110. Various embodiments of conductor system 100 are depicted with operator accessories 304, such as, for example, a laptop computer or an electronic keyboard.

The various components of conductor system 100 as described herein can be made from any number materials and in any number of configurations. In an embodiment, column 108 of podium 102 and legs 170, 172 of rack 172 are telescopically adjustable between 0 inches and 18 inches. In an embodiment, base 106 of podium 102 can be made of cast iron and can weigh between approximately 10 pounds and approximately 30 pounds, or approximately 20 pounds. In an embodiment, base 106 of podium 102 and base 176 of rack 104 includes between approximately 25 percent and approximately 75 percent of the entire weight of conductor system 100. The entire podium 102 can weigh between approximately 15 pounds and approximately 50 pounds, or between approximately 30 pounds and 36 pounds. Shelf 110 can be made of clear polycarbonate having a thickness between approximately ⅛ inch and approximately 3 inches, or approximately ¼ inch. Column 108, including outer mast 134 and inner mast 136, can be made of extruded aluminum. Cross members 178 of racks can be made of extruded aluminum and legs 170, 172 of racks 104 can be made be of steel.

Additional embodiments of conductor system 100, including podium 102, rack 104, and components thereof, are depicted in FIGS. 27-47.

The embodiments above are intended to be illustrative and not limiting. Additional embodiments are within the claims. In addition, although embodiments of the invention have been described with reference to particular embodiments, those skilled in the art will recognize that changes can be made in form and detail without departing from the spirit and scope of the invention.

What is claimed:
1. A customizable conductor system comprising:
a music stand; and
a support rack coupled to the music stand;
wherein the support rack includes:
an elongate member defining a first elongate member axis;
a first telescoping leg defining a first leg axis substantially transverse to the first elongate member axis, the first leg shiftably coupled to the elongate member with respect to the first elongate member axis and reversibly extendible along the first leg axis; and a second telescoping leg defining a second leg axis substantially parallel to the first leg axis; and wherein the music stand includes:

a leg retainer configured to receive the second telescoping leg, wherein the second telescoping leg is rotatable within the leg retainer about a first leg axis; and a shelf.

2. The customizable conductor system of claim 1, further comprising an accessory attachment device shiftably coupled to the elongate member.

3. The customizable conductor system of claim 2, wherein the accessory attachment device further comprises a second shelf that is longitudinally shiftable with respect to the first elongate member axis.

4. The customizable conductor system of claim 1, wherein the support rack further includes an accessory attachment device removably, shiftably coupled to the elongate member with respect to the first elongate member axis, the accessory attachment device configured to support a user instrument.

5. The customizable conductor system of claim 3, wherein the user instrument is selected from the group consisting of a laptop computer, a tablet computer, a smartphone, a flat-panel display, or an electronic keyboard.

6. The customizable conductor system of claim 2, wherein the accessory attachment device is configured to receive a telescoping height adjustment mechanism, the telescoping height adjustment mechanism rotatable within the accessory attachment mount about a first axis.

7. A customizable conductor system comprising:

a music stand having a shelf positioned on a column extending from a base at a substantially non-vertical angle, wherein the base further comprises two arms arranged in a substantially horizontal v-shape; and a support rack, wherein the support rack includes:

an elongate member defining a first elongate member axis and further comprising at least two cross members, wherein the cross members are longitudinally aligned to define a gap there between, a first telescoping leg defining a first leg axis substantially transverse to the first elongate member axis, a second telescoping leg defining a second leg axis longitudinally aligned with the first leg axis, and an accessory attachment device removably, shiftably coupled to the at least two cross members with respect to the first elongate member axis;

wherein the first telescoping leg is positionable proximate to at least one of the arms of the music stand base such that the support rack is proximate to the shelf.

* * * * *